(12) United States Patent
Soar

(10) Patent No.: US 9,126,514 B2
(45) Date of Patent: *Sep. 8, 2015

(54) VEHICLE SEAT INDUCTIVE CHARGER AND DATA TRANSMITTER

(75) Inventor: Roger J. Soar, Kelowna (CA)

(73) Assignee: CYNETIC DESIGNS LTD (CA)

( * ) Notice: Subject to any disclaimer, the term of this patent is extended or adjusted under 35 U.S.C. 154(b) by 566 days.

This patent is subject to a terminal disclaimer.

(21) Appl. No.: 13/533,832

(22) Filed: Jun. 26, 2012

(65) Prior Publication Data

US 2013/0005251 A1 Jan. 3, 2013

Related U.S. Application Data

(63) Continuation-in-part of application No. 12/923,594, filed on Sep. 29, 2010, now Pat. No. 8,791,600, and a continuation-in-part of application No. 11/922,788, filed on Dec. 21, 2007, now Pat. No. 7,863,859.

(60) Provisional application No. 61/272,491, filed on Sep. 30, 2009.

(51) Int. Cl.
  *B60N 2/48* (2006.01)
  *H02J 7/02* (2006.01)
  *B60L 1/00* (2006.01)
  *H01F 38/14* (2006.01)
  (Continued)

(52) U.S. Cl.
  CPC .............. *B60N 2/4876* (2013.01); *H02J 7/025* (2013.01); *B60N 2002/0264* (2013.01); *B60N 2002/4405* (2013.01); *H01F 38/14* (2013.01)

(58) Field of Classification Search
  CPC .................................. B60L 1/00; H01F 27/42

USPC ................................................... 307/9.1, 104
See application file for complete search history.

(56) References Cited

U.S. PATENT DOCUMENTS 5,264,776 A   11/1993   Hulsey
5,550,452 A   8/1996   Shirai et al.
(Continued)

FOREIGN PATENT DOCUMENTS

EP   1610439   12/2005
WO   00/16493   4/2000

OTHER PUBLICATIONS

Martin Gossar et al, Investigations top Achieve Very High Data Rates for Proximity Coupling Devices at 13.56 MHz and NFC Applications, DOI 10.1109/NFC.2011.12.
(Continued)

*Primary Examiner* — Robert Deberadinis
(74) *Attorney, Agent, or Firm* — Antony C Edwards

(57) ABSTRACT

A system to inductively transfer power and transmit and receive data between a support structure associated with a vehicle and apparel worn by a user. The support structure has one or more primary inductive power coils. The apparel has one or more secondary inductive power coils. Primary circuitry cooperates with the primary inductive coils to energize at least one of the primary inductive coils. Secondary circuitry on the apparel cooperates with the secondary inductive power coil. An inductive data transmit and receive sub-system allows wireless inductive transmission of audio, text, images, video and other data between the support structure when occupied by the user, the vehicle data bus the support structure is conductively connected to, and devices located on the apparel.

122 Claims, 16 Drawing Sheets

Primary side inductive power transmission; and, inductive battery and power data driver/receiver using a single primary coil Secondary side inductive power receiver; and, inductive battery and power data driver/receiver using a single secondary coil

(51) Int. Cl.
*B60N 2/02* (2006.01)
*B60N 2/44* (2006.01)

(56) References Cited

U.S. PATENT DOCUMENTS

| | | |
|---|---|---|
| 5,959,433 A | 9/1999 | Rohde |
| 6,301,128 B1 | 10/2001 | Jang et al. |
| 6,356,052 B2 | 3/2002 | Koike |
| 6,388,422 B1 | 5/2002 | Lew |
| 6,476,581 B2 | 11/2002 | Lew |
| 6,490,176 B2 | 12/2002 | Holzer et al. |
| 6,657,351 B2 | 12/2003 | Chen et al. |
| 6,906,495 B2 | 6/2005 | Cheng et al. |
| 6,960,968 B2 | 11/2005 | Odendaal et al. |
| 7,076,206 B2 | 7/2006 | Elferich et al. |
| 7,462,951 B1 | 12/2008 | Baarman |
| 7,612,528 B2 | 11/2009 | Baarman et al. |
| 7,728,551 B2 | 6/2010 | Reed et al. |
| 8,035,255 B2 | 10/2011 | Kurs et al. |
| 2002/0154518 A1 | 10/2002 | Elferich et al. |
| 2004/0145342 A1 | 7/2004 | Lyon |
| 2004/0145343 A1 | 7/2004 | Naskali et al. |
| 2004/0189246 A1 | 9/2004 | Bulai et al. |
| 2004/0232845 A1 | 11/2004 | Baarman et al. |
| 2005/0017958 A1 | 1/2005 | Silverbrook et al. |
| 2005/0127866 A1 | 6/2005 | Hamilton et al. |
| 2006/0087282 A1 | 4/2006 | Baarman et al. |
| 2008/0079388 A1 | 4/2008 | Sarnowsky et al. |
| 2010/0090491 A1 | 4/2010 | Hipshier et al. |
| 2010/0201201 A1 | 8/2010 | Mobarhan et al. |
| 2011/0018498 A1* | 1/2011 | Soar ............................ 320/108 |

OTHER PUBLICATIONS

System Description Wireless Power Transfer, Basic Power Transmitter Designs Version 1.0.3, Wireless Power Consortium, Sep. 2011, pp. 20-28 www.wirelesspowerconsortium.com.

Matched Anthropometric Database of U.S. Marine Corps Personnel: Summary Statistics. US Army Soldier Systems Command, Natick Research, Development and Engineering Center, Natick, Massachusetts Nov. 1995 www.humanics-es.com/ADA316646.pdf.

Wireless Power Consortium—System Description, Wireless Power Transfer ,vol. I: Low Power, Part 1: Interface Definition, Version 1.0.3, Sep. 2011.

Standard ECMA-340, Near Field Communication Interface and Protocol—1 (NFCIP-1), 2nd Edition, Dec. 2004.

Standard ECMA-352, Near Field Communication Interface and Protocol—2 (NFCIP-2), 2nd Edition, Jun. 2010.

Standard ECMA-386 Cryptographic Standard Cryptography Standard using ECDH and AES (NEC-SEC-01) 2nd Edition, Jun. 2010.

* cited by examiner

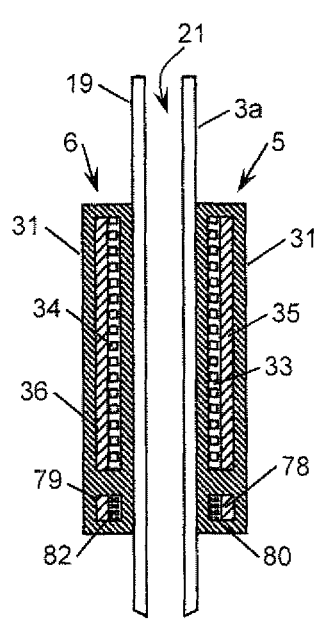
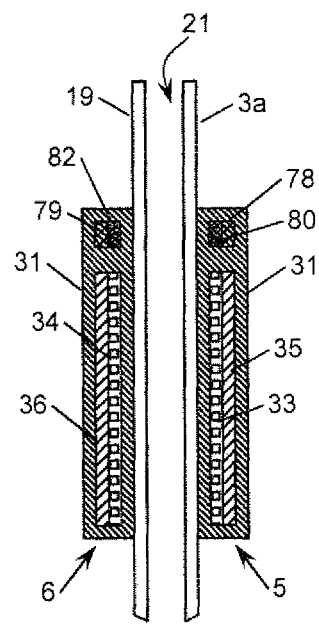
Figure 12a  Figure 12b
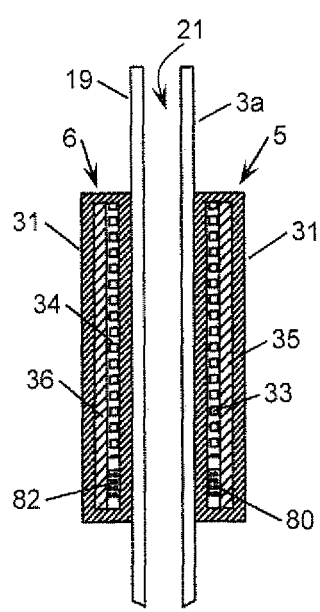
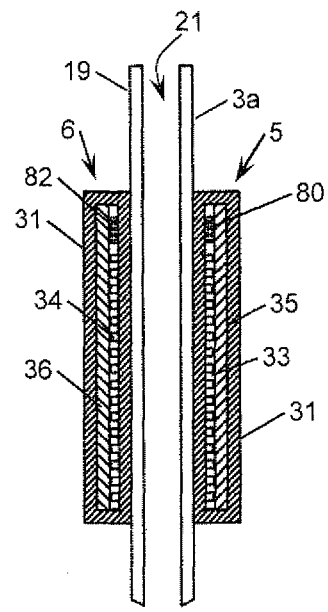
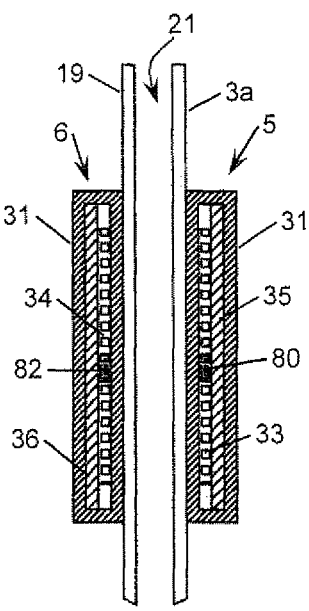
Figure 12c  Figure 12d  Figure 12e

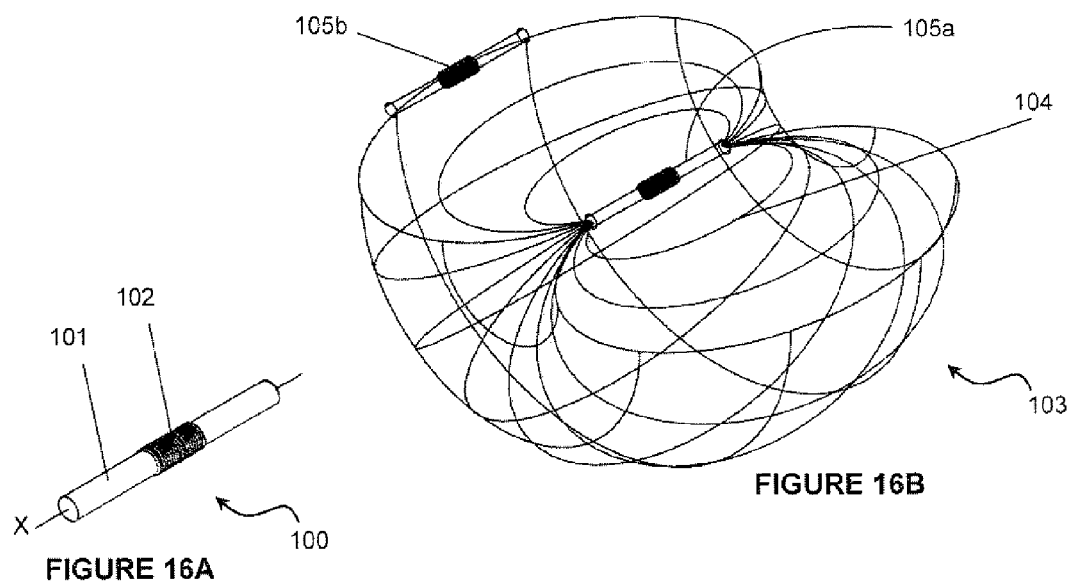
FIGURE 16A
FIGURE 16B
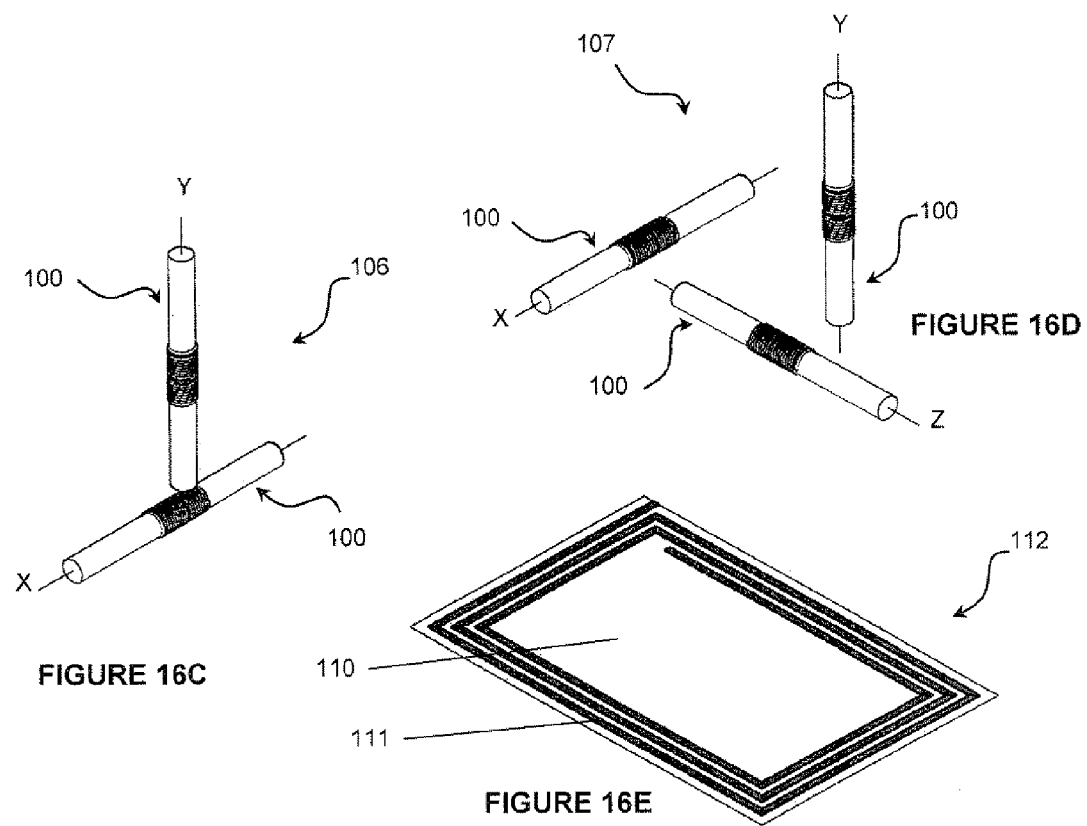
FIGURE 16C
FIGURE 16D
FIGURE 16E

VEHICLE SEAT INDUCTIVE CHARGER AND DATA TRANSMITTER

CROSS REFERENCE TO RELATED APPLICATION

This application is a continuation-in-part from U.S. patent application Ser. No. 12/923,594 entitled Vehicle Seat Inductive Charger and Data Transmitter filed Sep. 29, 2010, which is a continuation-in-part from the U.S. patent application Ser. No. 11/922,788 entitled Contactless Battery Charging Apparel filed Sep. 29, 2010, now U.S. Pat. No. 7,863,859, and also claims priority from U.S. Provisional Patent Application No. 61/272,491 filed Sep. 30, 2009 entitled Inductive Charging Vehicle Seat.

FIELD OF THE INVENTION

This invention relates to the field of devices for contactless inductively-coupled charging of batteries and inductive transfer of data including communications where the battery is worn by a user and the charging and communication occurs while the user is sitting, standing or laying in or on a support structure associated with a vehicle, such as in a vehicle seat, containing the primary inductive coil. The secondary inductive coil is worn by the user who occupies the support structure.

BACKGROUND OF THE INVENTION

In applicant's view, the personal power requirements of the soldier, sailor, aviator, or Marine (hereinafter collectively referred to as a soldier) continue to increase at a relatively rapid rate. The requirements for improved power management, power distribution and reduced weight of batteries that must be carried by the soldier was, inter alia, the subject of my PCT Application No. PCT/CA2006/001078 for Contactless Battery Charging Apparel filed Jun. 28, 2006, incorporated herein by reference, that describes the application of multiple inductive charging nodes distributed around the torso of the soldier, that are able to provide power through inductive coupling to equipment on the soldiers torso, weapons subsystem and helmet subsystem.

An important component of the present system is the utilisation of a central power source that could be any of several technologies including primary batteries, rechargeable (secondary) batteries, fuel cells or super-capacitors etcetera. Most soldier modernisation system designs favour that of rechargeable batteries as the central power source. The central battery could be swapped out and be replaced by another battery that is fully recharged. There is also the option for charging the central battery while it is still being utilised and carried by the soldier. A unique opportunity to recharge the battery presents itself when the soldier is being transported by a vehicle such as LAV, HMMV, an ATV, or any other vehicle including aeronautical or astronautical vehicles, or marine vessels, etc, that provide both seats for occupants and a power source for charging.

The need to charge the electronic equipment on a modernised soldier has been recognised since the original concept of modernised soldier systems. The use of primary batteries as a central power source has proven to be very poor option in terms of extra weight carried by the soldier, logistic support, etcetera. The provision of a rechargeable central power source to the soldier provides several options to input power when separated from barracks or forward operating base charging facilities. These options would include solar power, energy harvesting, AC recharging and the ability to access vehicle, aircraft or marine transport electric power.

Power from transportation could be as simple as swapping out a depleted battery (or the depleted components of a battery) for a fully charged battery (or fully charged components of a battery), or placing a charge into the battery once within the transport.

The existing Stryker Vehicle Integration Kit (VIK) provides the soldier when seated with an conductive electrical contact umbilical connection for DC power and communications with the vehicle crew. The energy provided by the umbilical connection directly powers both the Land Warrior system or other future soldier system and the charging of the main system batteries. This connection is not without problems as it has been determined it is not only difficult for soldiers to connect to the vehicle but that a failure of the AN/PSN-11 GPS PLGR has been linked to improper connections of the umbilical wiring harness to the host vehicle.

As applicant understands it, a primary objective of current US Army, and its NATO allies soldier modernisation research is to examine the potential for increasing the ruggedness, decreasing the cost and or weight of the system by improving the electrical connectors and cable/connector assemblies in a future warrior ensemble. This will also benefit any present and future combat soldier development program to which some of these improvements could potentially apply.

It is applicant's opinion that the existing round plug-ins for the cables on the Land Warrior's computer are bulky, costly, and prone to failure because pin-and-socket connections are less than robust. Existing connectors have a low life expectancy and exhibit failures of the connector pins and sockets. The Land Warrior system being fielded today consists of 40 connectors, including both the plugs on the cables and the receptacles.

Although there are in the prior art examples of inductive charging being used in-conjunction with vehicles, to the best of applicant's knowledge none describe where batteries worn on the body of an occupant of the vehicle are charged by the transfer of power inductively or that data or communications is transferred inductively between the occupant and the vehicle or vehicle seat. Hulsey (U.S. Pat. No. 5,264,776) and Koike (U.S. Pat. No. 6,356,052) are representative of patents for the transfer of electrical power to a vehicle for the purpose of safely charging on board drive batteries of either electric or hybrid powered vehicles from a AC power source. The other inductive technology application that has seen more interest recently is the use of inductive coupling to transfer power and data between personal hand held devices such as cellular phones, MP3 player, PDA, GPS etc that are stowed in the vehicles console or dashboard. See for example Hipshier (US Publication No. 2010/0090491 A1), or Sarnowsky (US Publication No. 2008/0079388 A1). Baarman (U.S. Pat. No. 7,462,951) describes the charging of power tools and other commercial devices within tool boxes or caddies located within the cab or box of a truck. Reed (U.S. Pat. No. 7,728,551 B2) teaches placing a primary inductive circuit in the vehicle seat back however it then inductively connects to a visible surface containing the rechargeable device. Baarman (U.S. Pat. No. 7,612,528 B2) also teaches placing a primary inductive circuit in a vehicle seat back which is a remote device holder and into which a device is placed. It does not teach the inductive transfer of power to a person's torso for the purpose of charging centralized batteries to power a soldier system.

With respect to prior art for inductive data transfer there is a significant body of work that has been documented on both the passive and active transfer of data with respect to inductively coupled RFID devices. To the best of the applicants knowledge none describe where data is communicated inductively between a vehicle seat to receiving devices on the occupant of the seat. Lair (U.S. Pat. No. 7,149,552 B2) and Palermo (U.S. Pat. No. 7,254,366 B2) are both representative of the transfer of data using near field inductive technology. Both involve the transfer of audio data between a communication radio and hand or head sets.

SUMMARY OF THE INVENTION

In summary, the Vehicle Seat Inductive Charger and Data Transmitter System according to one aspect of the present invention may be characterized as including two discrete sub-systems; namely, an inductive power transfer system and an inductive data transfer system for providing a user, while occupying a support structure associated with a vehicle such as while seated in a vehicle seat in a vehicle, with respectively electrical power and data communication without the use of a physical conductive electrical connection between the user and the seat or vehicle. The two sub-systems are discreet in the sense that in one embodiment only power or power and power data is transmitted, in a further embodiment only communication data, as broadly defined herein, is transmitted, and in yet a further embodiment a combination of the two sub-systems are employed simultaneously. In one embodiment the power transfer sub-system may include:
 a) a vehicle seat having a power-transmitting or primary inductive power coil array, where the seat is adapted to be mounted in the vehicle,
 b) apparel having therein a power-receiving secondary inductive power coil assembly, where the apparel is adapted to be worn by the user,
 c) primary electronics adapted for mounting in the vehicle and cooperating with the primary inductive power coil array, where the primary electronics includes a primary charging and controlling circuit adapted to energize with alternating or oscillating current at least one, that is, a primary inductive coil of the primary inductive coil array, and where the primary inductive coil is a primary inductive power coil which is adapted to transfer power, and wherein the inductive power system can also transmit power data or charge status data between the primary and secondary coils and power circuits,
 d) secondary electronics on the apparel which cooperate with the secondary inductive power coil assembly, where the secondary electronics include a secondary charging and control circuit,
 e) at least one power sink such as a rechargeable battery, for example one main rechargeable power sink such as a battery or super-capacitor assembly adapted for wearing by the user, or separate discreet power sinks in devices worn or sometimes carried by the user where the rechargeable power sinks are adapted for charging by the secondary electronics upon the inductive coupling between the primary and secondary inductive power coils when energized.

The vehicle seat may also have an inductive data communication sub-system where data is transmitted to an occupant of the support structure using a modulated magnetic flux primary inductive data coil or antenna and signal drive and data processing electronic circuits located preferably within the support structure such as within the vehicle seat. The apparel would thus also have therein a secondary inductive data coil or antenna and signal drive and data processing electronic circuits adapted to be worn by the user.

The present invention also includes a method providing one or both of the sub-systems, whether integrated or discreet components of the system. The method includes providing, for each sub-system, one or both of the support structure and its mounted componentry, including its associated circuitry, and the apparel with its mounted componentry, including its associated circuitry. The method, in another aspect, is also intended to include the use of one or both sub-systems.

The inductive data coil assemblies or antennas maybe of two dimensional (2D) or three dimensional (3D) geometries, and the primary and secondary inductive data coils may be integrated within the inductive power coil assemblies of both the support structure and the apparel.

The power for the energizing and charging is transferred solely via the inductive coupling from the primary electronics and primary inductive power coil to the secondary inductive power coil and the secondary electronics, and inductive power data is transferred via modulation of the inductive power signal between the primary and secondary inductive power coils for power data communications between the primary and secondary inductive power electronics.

Where the apparel is torso-covering apparel, the primary inductive power coils and primary communication data coils may be positioned on a seat back of the seat, and the secondary inductive power coils and secondary communication data coils may be located on a back portion of the torso-covering apparel. The primary inductive power and primary communication data coils may be arrays in one or two dimensions (2D or 3D) which are positioned on the seat back to correlate the position of at least one of the primary inductive power and primary communication data coils in their arrays with the location of the secondary inductive power and secondary communication data coils on the back portion of the apparel. The seat back may be flexible or compliant and the primary inductive power coils and primary communication data coils may be at least in part, correspondingly flexible or compliant or conformally shaped. The primary and/or secondary inductive power and data coils and, where applicable, a corresponding ferrite backing on the coils may be segmented to provide the flexibility. The secondary inductive coils may be flexible for substantially conformal, and substantially parallel alignment between the primary and secondary inductive coils when the user is sitting in the seat with the back portion of the apparel against the seat back. Alternatively or additionally the primary and/or secondary inductive power and data coils may be contoured so as to substantially conform in shape to the user's torso or the equipment the user is carrying such as a hard armor plate. A sleeve having the primary inductive coils mounted therein may be used for retrofitting seat backs, where the sleeve is sized to fit over the seat back. Where the arrays of primary inductive power and data coils are one dimensional arrays, for example linear arrays, advantageously the arrays are oriented vertically in the seat back.

In one embodiment the system may further include electrically powered small devices for carrying by the user in inductively coupled proximity to the apparel. The small devices have secondary or rechargeable power sinks such as batteries for electrical operation of the small devices. The apparel or modular pocket has at least one small-device primary charging inductive coil and drive circuits. The small devices include corresponding small device secondary inductive coils and associated circuits positioned and adapted for charging of the small device rechargeable batteries when the small device inductive secondary coils are in charging proximity to the small-device-primary charging inductive coil. The small-device-primary charging inductive coil is positioned on the apparel so as to transfer electrical power to the small device secondary inductive coil when corresponding small devices are carried by the user and the small-device-charging inductive primary coil is energized. As used herein, the terms worn or wearing are intended to include such positioning or carrying of the small devices by a user In a further embodiment the primary inductive coil assembly includes a plurality of primary inductive power coil arrays mounted to the seat, and the primary inductive power electronics includes a plurality of primary electronics corresponding to and cooperating with the plurality of the primary inductive power coil arrays. In this embodiment the secondary inductive power coil assembly may include a corresponding plurality of secondary inductive coils or coil arrays positioned to correspond to the plurality of primary inductive power coil arrays.

In a preferred embodiment the primary and secondary inductive power coils and inductive data coils and their arrays are each encapsulated within an environmentally resistant encapsulation. The encapsulation may be polymer encapsulation with the environmentally resistant encapsulation preferably at a minimum dust and water-proof.

The inductive coupling for both power and data systems encompass an air gap between the primary and secondary inductive power and data coils. In one embodiment the inductive coils each have a ferrite backing or core. Advantageously, the ferrite backing is positioned relative to the coils so as to increase inductive efficiency within the inductive coupling by minimizing stray flux and increasing and directing flux density across the air core. An air gap in this instance means a space between the primary and secondary inductive power coils that is occupied for example by air, plastic, fabric, or any combination of these and other non-magnetic materials. Again, the ferrite may be segmented to provide flexibility In one embodiment the seat includes a metal frame and the primary inductive power drive electronics is mounted to the metal frame so as to provide a heat sink for the primary electronics. The drive electronics may also be mounted to the vehicle to provide a heat sink The secondary inductive power electronics may be mounted adjacent the secondary inductive coil, or for example may be mounted within the secondary inductive coil, and so as to be substantially co-planar therewith.

On a periodic interval the primary drive electronics pings or polls the immediate zone of the primary coil and the seat back it is contained within to see if a user with a system matching secondary coil is within proximity and that the transfer of inductive power should be initiated.

Further advantageously a proximity sensor maybe provided cooperating between the primary and secondary inductive power coils indicating a coupling proximity of the primary inductive power coil array to the secondary inductive power coil, so as to allow the inductive drive circuit to be powered. The proximity sensor may be adapted to communicate a trigger to the primary electronics upon attaining the coupling proximity. The primary electronics may be adapted to only energize the primary inductive coil upon receiving the trigger. The proximity sensor may include a primary element adjacent the primary inductive coil and a secondary element adjacent the secondary inductive coil. The primary and secondary elements cooperate to generate the trigger. The primary sensing element may for example be a hall effect sensor and the secondary element may be a magnet. Other sensor types could also be employed.

The main rechargeable power sink such as a battery assembly or assemblies may each include a charging and control circuit adapted to monitor charging required by the corresponding main power sink and to correspondingly charge the main power sink as required upon the establishment of an inductive power coupling. If the charging and control circuit determines no charging is required then corresponding power sink status data may be communicated inductively to the primary inductive drive electronics and the power transfer via the inductive power coupling may be terminated by the primary electronics. The primary power drive electronics may be adapted to interrogate or to receive notification from the secondary electronics through the inductive coupling to determine the charging required by the main rechargeable power sink or sinks.

The primary and secondary inductive coil assemblies may include, respectively: a primary inductive power transfer coil array and a separate primary inductive data transfer coil array; and, a secondary power transfer coil and a separate secondary data transfer coil. The primary and secondary data transfer coils may be embedded in, respectively, the primary and secondary power transfer coils. Where the primary and secondary inductive coils each have a ferrite backing, the primary and secondary data transfer coils may be interleaved with, respectively, the primary and secondary power transfer coils and the ferrite backings. The primary and secondary data transfer coils may also be non-concentric with the primary and secondary power transfer coils respectively. The primary and secondary data transfer coils may be spaced apart and be a separate entity from the primary and secondary power transfer coils respectively. The primary power transfer coil and the primary data transfer coil may be substantially co-planar.

BRIEF DESCRIPTION OF THE DRAWINGS

FIG. 12a-e presents a series of partial cutaway sections that show a variety of planar inductive power coil assemblies with integrated co-planar inductive communication data coils, wherein:

FIG. 12a illustrates both primary and secondary coil assemblies with smaller diameter ferrite backed data coils placed within the inner diameter of the larger ferrite backed inductive power coils.

FIG. 12b has the placement of the power and data coils reversed with the data coil and ferrite backing now placed on the outside diameter of the inductive power coils.

FIG. 12c illustrates the primary and secondary power and data coils having a common ferrite backing support with the data coil placed on the inside diameter of the power coil.

FIG. 12d the data coil is placed on the outside diameter of the power coils while still utilising a common ferrite backing.

FIG. 12e is a further arrangement where the data coil is positioned in the middle of the power coil diameter on both the primary and secondary coil assemblies. Further iterations of coil arrangements are possible as would be known to one skilled in the art.

FIG. 16a is a diagram of a single ferrite rod data communication coil assembly or antenna with an inductive coil located at its centre.

FIG. 16b is an illustration of the magnetic flux lines that form a torus shape, that are produced by the inductive coil when it is energized alternating current and can then be modulated for inductive data communication and received by a secondary receive transit antenna, FIG. 16c is a diagram of two ferrite rods located nominally at right angles to each other so as to produce a 2D data communication antenna that reduces orientation requirements of the transmit and receive antennas relative to each other to maintain inductive coupling without loss of signal strength.

FIG. 16d is a diagram of three ferrite rods nominally located orthogonally to each other so as to produce a 3D antenna that eliminates angular orientation requirements for inductive coupling to a receiving inductive data coil or antenna.

FIG. 16e is a diagram of a planar rectangular coil as an inductive data communication coil that could be constructed from for example a printed circuit board trace.

DETAILED DESCRIPTION OF EMBODIMENTS OF THE INVENTION

My U.S. patent application Ser. No. 12/923,594 is incorporated herein by reference.

In the prior art, a military vehicle such as discussed above, or an aircraft, or a vessel, or many other forms of vehicles, or holding areas having seats, have a hull, wall or body having an electrical power, communications and data bus built therein or mounted thereto for providing electrical power, communications or data via a cable with conductive electrical contact connectors or umbilical from the vehicle electric power source. The cable passes around, over or otherwise to the soldier or other occupant, to an electrical connector on for example the occupants vest or other attire. In what follows although the present invention is described in the detailed example of a soldier being transported in a military vehicle, it is to be understood that the present invention is not so limited and may be employed in many other applications, for example, where civilian vehicle occupants are being transported, or where civilians or soldiers are merely waiting, for example seated in a staging area awaiting transport, or where the vehicle is a vehicle for not only land but also for use in or on water or above-land in the near and far field so as to include aircraft or zero-atmosphere vehicles, collectively, and without limitation, referred to herein as vehicles.

Figure 1:
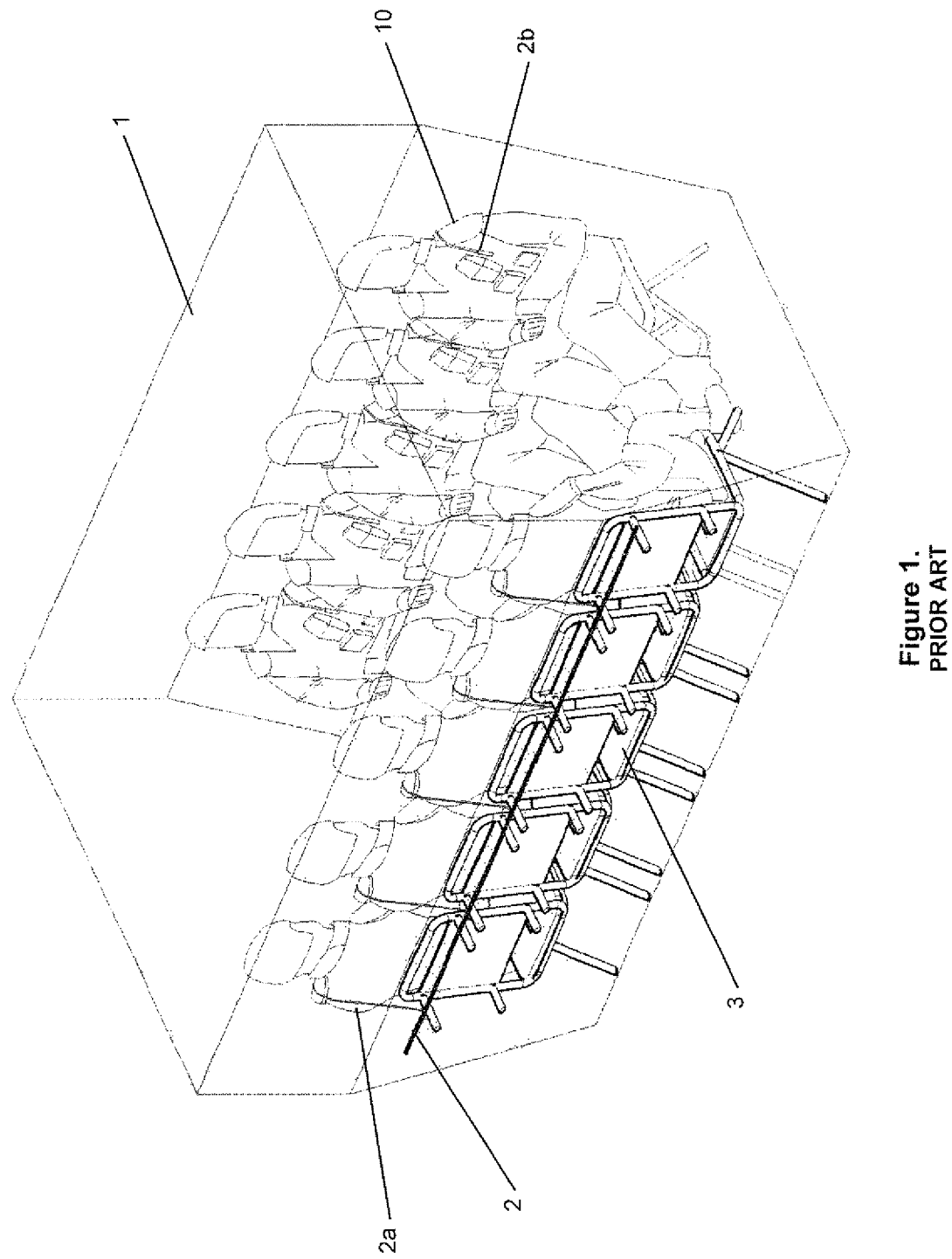
FIG. 1 illustrates conventional very closely positioned troop seating within an armoured vehicle, and also illustrates the use of a conventional conductive electrical contact connector and cable umbilicals for power and data connection where the umbilicals in this illustration pass over the soldier's shoulders from the main vehicle power and data bus. The umbilical cables may be positioned in any of multiple locations around the seat depending on the design of the vehicle and its power and data interfaces.

A means of providing wireless power, communications and data through a inductive charging and inductive communications and data transmission-capable support structure associated with the vehicles, such as for example, a vehicle seat eliminates the need for umbilical cables that provide electrical power and communications data to a mating connector on the soldier's clothing or equipment for the purpose of charging discrete pieces of equipment batteries or central batteries. As used herein the term support structure is intended to include, without limitation, seats, platforms (for sitting, laying, or standing), walls, floors, and other load bearing surfaces within and on the outside of a vehicle. The interior of military vehicles such as seen in FIG. 1 is very confined and busy with existing equipment, therefore the elimination of up to eight or more pendant cables would be of considerable benefit. Such pendant cables must be switched so that unprotected live cables do not short if they come into contact with stray conductive objects. Inductive power transfer according to one aspect of the present invention would automatically switch on and off, and even with power on cannot be shorted by metallic objects. Any metallic object placed against the seat back cannot falsely trigger the primary drive to turn on due to the primary inductive polling processor recognising that a valid secondary circuit is not in place and transmitting back an acknowledgment signal. A particular nuisance for existing connector technologies is the low survival rate of the connector during multiple rough connect and disconnect cycles associated with the often harsh military vehicle environment. This disadvantage is addressed by the present invention. Further disadvantages are described below.

For example, the cleanliness of the connector socket that may be located outside of a soldier's sight line, is difficult for the solider to inspect prior to connection. Sockets are frequently rendered inoperable due to environmental (i.e. mud, sand, dust etc) contamination. The load carriage vest of a soldier protrudes as much as six inches (15 cm) away from the lower part of his torso. Due to the roughness of the ride within a military vehicle, there may be considerable difficulty for troops to be able to locate the system charging socket under all their vest equipment and establish a power connection. Any connections that must be made underneath the overhang of the vest must be made by feel alone. If the connector pins are damaged, obstructed or sufficiently dirty to not make contact when connected to the vehicle, it may be impossible for the soldier to clean or otherwise repair the connector until the soldier takes the load carriage off. Not only is this nearly physically impossible within the confines of the vehicle, but also not advisable if a rapid disembarkment were to take place.

If a soldier has to rapidly disembark, the soldier may disconnect early, removing the opportunity for further charging and continued communication with the vehicle operators. They may also disembark hurriedly without disconnection and damage either the connector or cable on the vehicle or their own equipment.

A soldier may be in the vehicle for a sufficiently short time that they do not bother to plug into the umbilical and therefore lose recharge time that would otherwise have been obtained as soon as they sat in an inductive charging capable seat. These issues are mostly if not entirely eliminated by the contactless power and data transfer afforded by inductive power and data coupling according to the present invention. Any occupant of the seat would instantly and automatically start to receive charge even for very short periods of time in situations where the occupant would otherwise probably not bother to use a manual connection.

Most soldier modernisation systems use central rechargeable batteries as the main power source of their electronic equipment suite. The connection between the central battery or batteries of the soldier is unaffected by the introduction of inductive charging to the soldier system and the central battery may still be swapped out for a fully recharged one as would have been previously done. A unique opportunity to recharge the battery presents itself when the soldier is being transported by a vehicle such as LAV, HMMV, ATV, or any other military vehicle that provides both seats for occupants and a power source for charging. To eliminate the need for conductive electrical contact power communication and data connectors that have a high rate of failure, inductively coupled power, communications and data (hereinafter communications and data is referred to as communication data) can be transferred from the seat to the soldier. The moment the soldier is sensed to be sitting in the seat, a primary power inductive coil or coils in the vehicle's seat, for example in the seat back, generate a magnetic flux and inductively connect to a secondary inductive power coil or coils located on the soldier. Once an inductive connection is made between the primary and secondary coils, the rechargeable central power source on the soldier starts to receive power. At the same time a separate inductive communications link may be established between the soldier and the seat providing the soldier with inter and intra vehicle communications and data access capability which cannot be detected or intercepted from outside the vehicle.

The present invention provides battery charging power and communications data to the soldier through inductive wireless coupling in the vehicle seating. Each seat within the vehicle may be fitted with inductive charging and communications capability, however, the preferred military embodiment is to have such installations in the troop seats. Each of the troop seats may be identically fitted so that the same capability is provided regardless of which seat a soldier would sit in. The primary power transmitter circuit continually polls or pings looking for an appropriate secondary circuit to which it can provide inductive power. An optional power conserving sensor can sense the moment the soldier is sitting in the seat and initiate the primary drive polling sequence. The proximity sensor trigger can for example be a magnet to trigger a hall effect sensor. Once an inductive connection is established between a primary power coil and a secondary power coil on the soldier, the rechargeable central or main power source such as a main battery would start to receive power, for example through the operation of central battery charging sub-circuit. The power that may be provided through seat inductive charging would be determined by the capacity of the batteries carried by the soldier, with no reasonable upper limit on the capacity to be charged. At the same time an inductive communications data link may be established between the soldier and the seat, providing the soldier with inter and intra vehicle communications capability. The primary inductive data coil antenna may be planar and co-located within the inductive power coil assembly or be a separate coil such as an inductive coil on a ferrite rod, which may also be configured as a 2D antenna utilising two ferrite rods or a 3D antenna utilising three orthogonally positioned ferrite rods. The primary inductive data coil which may transmit or receive inductive data is connected to the inductive communication data primary drive and data processing electronics which can be co-located with the inductive power drive electronic circuits or be in a stand-alone enclosure. The data processing electronics are in turn connected to the vehicles data and communications bus. The secondary inductive data coil integrated into the soldiers apparel maybe of the ferrite rod configuration or be integrated into the planar secondary power coil assembly and is connected to the data transmit/receive and data processing electronics. Inductive audio and data communications with the vehicle and vehicle crew would be automatic without the requirement for the soldier to manually pair the devices.

Troop seating which is provided within a vehicle may be of many varieties and may be rigidly or adjustably mounted within the vehicle. In many instances vehicles are fitted with an energy or shock absorbing seat to protect troops from either improved explosive device (IED) blast acceleration, or, in the case of aircraft, protection from hard or crash landings. The seats may face any direction and be attached to bulkheads, sidewalls or may be frame mounted. Many troop seats are fabricated with a simple tubular frame fitted with a fabric sling seat and back or may be upholstered seats with foam cushioning and bolsters. Restraint systems such as lap belts or four point harnesses are often incorporated into the seat design to keep the soldier snugly secure if a rapid acceleration is too occur. Regardless of the seat design, soft or hard materials used, or construction methodology, most if not all seating may be fitted with an inductive charging and inductive data communication system according to the present invention.

To accommodate the different height of torso on a soldier where the secondary inductive power coil is located, (that is, the taller the torso, the potentially higher the location of the secondary inductive coil) a height adjustment capability may be incorporated for the primary inductive power coil in the seat back. Such a primary coil may for example slide up and down within a flexible or semi-rigid (e.g. fabric or plastic) channel and be secured in place at the desired height with a fastening device such as webbing with hook-and-loop fasteners. Alternatively, an array of primary coils may be provided as discussed below.

The inductive seat charging system according to the present invention may be designed into new seats or be retrofitted onto existing vehicle seating. Where the seat back is a fabric sling back, the fabric back may simply be removed and replaced with a fabric back incorporating the primary inductive power coil assembly. On foam upholstered seats a new seat cover may be provided that incorporates the primary inductive power coil or alternately an elasticized sleeve seat cover containing a primary power and data coil assembly may be slid over the seat back. Other ways of attaching the primary power coil to the seat may be designed to provide this same functionality.

In one embodiment, the primary inductive power coil assembly is placed on the back side of the front seat cover, and the primary inductive power coil drive electronics, may be located at a remote location (for example approximately 15 cm-1 m) from the primary coil assembly with connecting cable there-between. The inductive power coil assembly may be thin, i.e. <5 mm. The bulk of the drive circuit would give the coil assembly a profile that is not conducive to being located inside a seat cover. Consequently, until such time as the drive circuit may be sufficiently miniaturized, it may be mounted on the seat frame. The primary coil winding may be of different geometries, but typically it will be planar, with the option of a ferrite backing and shielding.

The primary inductive power drive circuit may be configured to accommodate most types of input power including both AC and DC power inputs. Typical military aircraft and vehicle power input requirements are presently 28 VDC, whereas many civilian commercial vehicles are presently 12 VDC. Interface may also be required to a CANBUS system or Common Modular Power System (CMPS) or other vehicle system for the various communications, data configuration and diagnostic capabilities afforded by these systems.

Next generation commercial and military vehicles may employ higher voltage energy storage plants such as Lithium-Ion Batteries or Super Capacitors. These energy storage plants will typically operate at around 300 VDC to optimize hybrid motor operation. The ability to provide significant amounts of power at higher voltage power may dictate new inputs for inductive power conversion systems.

At the present time it is expected that initial power output to the battery charging circuit will be approximately 10-100 W. At 50 W output this would for example allow the charging of two 50 W batteries at a 0.5 C charge rate. However in the foreseeable future, the charge rate capacity of soldier system main power batteries may increase to as much as 2 C or greater requiring increased charge power. As it will be very desirable to charge the main batteries as fully and quickly as possible to obtain as much power in what may be very short time periods, the output of the primary circuit and the secondary circuit will need to be increased to stay in line with battery charging technology advancements. The inductive secondary power coils along with associated rectification sub-circuit and power conditioning electronics and power management sub-system, may be placed in and around the back of the soldier's apparel such that the secondary power coil assembly would be located close to the seat back and on the same axis as the primary inductive power coil, that is, so that the axis of the secondary inductive power coil is substantially co-axial with axis of the primary power coil, to provide the highest inductive coupling efficiency as seen in FIG. 3b for example. The secondary circuit of the inductive power transfer system, the AC rectification and voltage regulation circuit may be configured to provide a specific DC voltage to the battery charging circuit, with the voltage range typically in the range of 15-24 volts DC. The battery charging circuit may be designed to accommodate SMBus smart battery data protocols.

The inductive communications systems equally affords the soldier with rapid convenient access to data information without having to make a connection. Again in a very rapidly changing environment as described above for inductive power connection, it may be critical for the soldier to have immediate access to all the various forms of data communication necessary for the soldier's role outside of the vehicle.

If the soldier is equipped with an inductive data system that for example uses Near Field Communication (NFC) standard protocols then as soon as the soldier is seated, the inductive data system comprised of the seat and apparel components would recognise the soldier's presence, perform the required handshake routines and provide the soldier essentially instant audio communication to the vehicle crew, an ability that it is not possible with present equipment configurations in use today. In addition when the soldier is to disembark, because the soldier's personal GPS system may have been shielded from the GPS satellite signal and so may take several minutes to re-locate itself, with the use of an inductive data link the vehicle can continuously upload the vehicle's GPS position to the soldier's personal GPS system so that the soldier has the most current GPS position upon disembarking from the vehicle. Further examples of wireless inductive data communication include the soldier connecting to the vehicles data bus and accessing video images from the outside of the vehicle so that the soldier knows the outside environment the soldier will be disembarking into, rather than exiting the vehicle into unknown conditions and environs. In a similar fashion the soldier can up or down load images, text orders, data or provide or receive other relevant battle or situational information.

The secondary communication data coil or antenna can be located anywhere on the soldier's apparel. One location would be on the upper back or rear collar area of the apparel, with the secondary inductive data processing electronics for the coil located in close proximity. It is conceivable however that a vehicle would require a soldier to lie down or be reclined with either the soldier's back against a back rest or with the soldier lying with the front of the soldiers supported, in which case the secondary communication data coil or antenna may be located along the back or front of the apparel respectively, or combinations of these. As used herein the term apparel is intended to include webbing, vests, body armor, backpacks, harnesses, coats, shorts, belts, pants, shoes or boots, gloves, goggles, glasses, hats, helmets, wet-suits, NBC or other environmental isolation suits or any other attire, military or civilian. The secondary inductive data antenna, drive and data processing electronics may connect to the soldiers central computer or be connected to independent data devices such as GPS, heads up displays, radios and audio equipment directly. The secondary data coil and associated electronics is capable of both receiving and transmitting data.

Additional benefits of the invention may include one or more of the following:

The inductive power and communication data systems are environmental proof in that both the respective primary and secondary coils and associated circuits are completely sealed, as no physical conductive electro-mechanical connection between them is required. Therefore the inductive power and data communication system, in that it is completely sealed from the environment, may be fully submersed and remain unaffected by sand, dirt, snow and POL's (petroleum's, oils and lubricants) and other battlefield contaminants.

If a soldier is injured, the soldier may not be able to connect a conventional in-vehicle power and data connector. With the inductive coupler the soldier only needs to be able to sit in the seat to receive power and be able to communicate. If the seat is of a design which allows the seat to be reclined, the soldier may in effect lay down, and still be re-charging and/or communicating. Alternatively, if the soldier (or other user) is standing against a wall having therein the primary inductive coil or coils, or is standing on a platform having therein the primary inductive coil or coils, the user may be re-charging and/or communicating wherein adjacent the wall or platform, the latter for example being inductively coupled with the user's footwear.

As the power and data transmission use magnetic flux resonance (inductive coupling) to connect, they are unaffected by radio jamming technologies used to defend against radio frequency (RF) initiated IED's.

When a soldier dons a nuclear/biological/chemical (NBC) mask, or other forms of isolation suit, it is often extremely difficult for the soldier to look down or around, especially within the confines of a vehicle. A considerable issue is the fogging up of the eye lenses which makes the simple task of making connections within a vehicle very challenging. All other equipment must remain functional, including charging of all electronics. The more encumbered and stressed the soldier becomes, the less likely the soldier is too perform routine procedures such as plugging in power and data cables. The requirement to plug in is removed from the soldier with inductive power transfer and inductive data communication.

In addition to armoured vehicle use, the same soldiers that would use inductive charging in a vehicle could just as easily be transported in an airplane, helicopter, hybrid aircraft such as the V-22 Osprey; fast transport vessels such as hovercraft or AAAV (Advanced Amphibious Assault Vehicle) or ATV's and any type of marine vessel etc. All the attributes and benefits of using inductive power and data communications applies to the use of the inductive charging and data communication seats according to the present invention in these modes of transport as it does ground vehicles.

The inductive system may for example be fitted in extremely wet environments such as fast river boats, special forces wet insertion submarine where conditions almost approach or are completely submersed or when operating in freezing conditions where conventional connector operation would be extremely difficult. Due to the fact that inductive power and charging and data communications can operate while submersed or even when coated in ice, these type of operating conditions do not present insurmountable obstacles to charging of central batteries worn by the soldier or to his ability access communication data.

As stated above, although a preferred embodiment is primarily intended for military applications, the present invention is not limited to military as it could also be used by primary responders such as police and fire or civilians in commercial or private applications. With the proliferation of inductively charged systems for personal electronics, civilian garments may be designed with central charging systems. The electronic devices carried within these garments may then be charged when the occupants are seated in a vehicle such as a car or truck equipped with an inductive charging seat.

The primary power drive circuit device uses an LC resonant tank circuit that is inductively coupled to a secondary coil and associated circuits, and forms an air core transformer. The primary circuit electronics may be comprised of both control and inductive magnetically resonant circuits. The primary side may typically include, but not be limited too, a frequency generating or oscillator circuit and a power switching driver(s) such as a MOSFET bridge drivers that in turn power the LC resonant tank circuit placing an alternating current through the inductive component of the LC tank circuit, the primary inductive power coil. A feedback loop may be applied to maintain optimal resonant frequencies between the primary and secondary inductive power coils and related circuits. Base power for the primary power circuit is provided from the main electric power bus of the vehicle. If required there may be two or more independent primary circuits each leading to their own corresponding primary coils located in different places on the seat or seat back. Each primary inductive coil in turn inductively connects to a secondary inductive power coil and power conditioning and charging circuit that maybe placed in different areas of the soldiers apparel, for example spaced apart on the torso.

The primary charging power circuit may be tuned to a single resonant frequency, for example, 200 kHz or be an auto tune circuit that maintains resonance over a range of frequencies as external factors dictate, as would be known to one skilled in the art. Many topologies or architectures for this circuit maybe constructed depending on the needs identified or specific design requirements that accommodate different frequencies, impedance, inductance and capacitance of the major components, again as would be known to one skilled in the art. The resonant frequency of the power tank circuit would typically be selected within the range of 100-500 kHz, but certain applications may require operation into the 10's of MHz. The resonant characteristics of the power tank circuit will change as the distance between the primary and secondary coil distance changes, due to the mutual inductance between the primary and secondary power coils changing, which in turn changes the apparent inductance of the primary power coil and so changes the required resonant frequency of the tank circuit. The primary inductive resonant circuit may therefore be auto-tuned to work over a pre-determined range of operating distance, that is, the distance between coils and when the soldier is properly seated against the seat back, so as to obtain optimal performance. This operating distance in turn is determined by the sensitivity or use of proximity polling routine or the optional proximity sensor and the distance over which it will turn the primary circuit on and off. Depending on how much the soldier moves around in the seat, that is the magnitude and frequency of soldier shifting away from or out of alignment with a seat back, the primary circuit may turn on and off several times during a vehicle trip. The tuning optimisation of the primary power resonant frequency is preferably performed by a tank circuit auto-tune sub-circuit integral to the primary coil drive. There are several ways that this could be performed as would be known to one skilled in the art.

An inductive power transfer or charging system maybe applied to the seat that is able to sense the presence of the secondary circuit by polling or pinging using the primary coil to locate or identify the presence of a secondary circuit that responds back to it inductively before the primary drive initiates a higher power level of inductive power transfer. An example of such a process is documented within the Wireless Power Consortium protocol regarding interface requirements (Wireless Power Consortium—System Description, Wireless Power Transfer, Volume I: Low Power, Part I: Interface Definition, Version 1.0.3, September 2011).

In many inductive power charging applications the primary circuit is co-located with the primary drive coil. However in this application the primary circuit may be located at a short distance (e.g. 10-50 cm) away, mounted on the seat frame. A shielded cable may be used to connect the primary coil to the primary drive circuit. It may be advantageous to mount the primary circuit on seat frame because the frame provides a heat sink, allowing for high power output circuit designs.

To reduce or eliminate disruptive EMI or be or to prevent the circuit being susceptible to other device EMI, shielding and appropriate circuit design maybe required for the primary inductive power drive and sub-circuits.

The secondary charging and controller circuit may be co-located with the secondary charging coil on the torso of the soldier's, apparel. For example it may be integrated into the load carriage or tactical vest. The secondary circuit provides rectification of the received inductive AC power signal. It also regulates the voltage as required, and passes power to the battery charging and control circuit. The battery charging circuit monitors the charge required by the central battery and charges it accordingly when power is available from the primary inductive power coil via the secondary inductive power coil. The primary inductive power circuit, via the primary inductive power coils may inductively interrogate the secondary circuit to, firstly, determine if the secondary circuit is present, and secondarily to determine if charging of the central battery is required, as reported by the secondary inductive power circuit. If battery does not need charging, then the primary circuit removes charging power and falls back into an interrogate-only mode. One method of controlling charge rate is described in the Wireless Power Consortium specification whereby the secondary power receiving circuit can communicate power flow or charge status of the battery by changing the resonant circuit characteristics of the secondary power coil tank circuit and through the mutual inductance between the primary and secondary coils cause a modulation of the resonant drive frequency being generated by the primary drive circuit. The primary drive can then decode the modulations and derive the charge status of the battery being charged.

The central battery (or batteries) of the soldier system may be of any type of rechargeable battery, although a high capacity Li-Ion battery or similar is preferred due to its high energy density. The battery may be of conventional box shape configuration, a flexible or conformal battery, or be a battery that is a part of a hard armour ballistic plate. The battery may be a stand alone battery that powers the various electronic devices on the soldier or be configured to be managed by a power management system as a part of the soldier system. The central battery may power inductively charged modular pockets carried on the soldier's apparel including vest, etcetera. As an alternate system configuration it is also possible that there is no central battery carried by the user and even no power management system. In this event, the rechargeable batteries that power each user portable device can be recharged directly through a wiring harness and power transfer nodes or connectors distributed on the vest from the secondary inductive power conditioning circuit.

The primary drive circuit may, as mentioned above, include a low power proximity sensing circuit. This circuit, in conjunction with for example a hall effect detector located within the primary coil and a magnetic trigger within the secondary coil, would allow for more energy efficient operation, as the primary circuit would not have to constantly poll for the presence of secondary inductive power circuit.

Other options for secondary circuit detection are available. One such option is that the primary auto tune circuit and control micro-processor look for a change in the inductance of the primary power coil. As a power secondary coil is brought into proximity, the mutual inductance of coil as it couples with the primary coil changes the inductance of primary coil. This can be detected by the auto-tune circuit of the primary coil.

The primary coil inductive power coil, as mentioned above, in one embodiment maybe a low profile design (i.e. <5 mm) to allow it to be easily fitted into or onto almost any seat design. Coil windings of the primary and secondary inductive power coils respectively may for example be wire wound using conventional enamelled copper magnet wire, multi-filament Litz wire, coil designs etched into single, double sided or multi-layer printed circuit boards, single, double sided or multi-layer flexible substrates such as Mylar™ or Kapton™ etc, and be of substantially any geometric shape, all of which as would be known to one skilled in the art. The primary inductive power coil may be larger than the secondary inductive power coil, or the secondary coil may be larger than the primary coil and each may be of a different shape. For example the primary power coil may be elliptical in shape and the secondary coil circular or an ellipse rotated 90 degrees to the elliptical coil in the seat. Coils with a Q-factor from very low to greater than 100 may be used as the coil orientation is primarily fixed and therefore can accommodate a variety of coil designs and 'Q' can be employed. The higher the Q however, the better coupled the coils and overall system efficiency will be higher or better optimised. Distances over which power can be transmitted ranges from the minimum distance of the thickness of the various fabrics and coil assembly packaging materials in both the seat and apparel which is as little as a few millimeters to 15-20 centimeters. Typically the most efficient distance for the inductive transmission of power is dependent on the coil diameter and the type of resonant circuits and auto-tune sub-circuits that are employed for transmission and reception of the alternating current drive signal. For the most part with an elliptical coil with a major axis length of 30-40 cm (12-16 inches) would have a maximum power coupling distance of approximately 15-20 cm (6-8 inches), with optimal coupling at reduced separation distances.

The primary and secondary inductive power coils may be air backed or, to aid in optimising the efficiency of the inductive wireless power transfer between the primary and secondary power coils, different shapes and thickness of ferrite backing may be employed to manipulate the shape of the coils' magnet flux. For example, the ferrite may be of a simple round planar design or utilise more complex geometries (ovals, hexagon etc) to accommodate location within the seat or the torso of the soldier's apparel for the primary and secondary power coils respectively. The ferrite may be of conventional rigid ceramic or a flexible polymer based ferrite or other suitable material. If a rigid ferrite is used to hack the coil, the planar ferrite may be one of many profiles such as a bar, channel or angle and may either be curved so as to be form fitting to the curvature of the seat back or may be divided into segments. Segmenting the ferrite allows a modest amount of flex, that is, an encapsulated coil assembly may flex so that it may conform to the shape of the seat back as the seat back deforms when it is occupied while also providing increased ruggedness and reduced manufacturing costs over a single ferrite piece. A laminated or woven high permeability material may be used behind the coils for mechanical structure and shielding.

The ferrite backing and coil assembly may be encapsulated in either a rigid or flexible protective polymer that would not only provide it with the environmental protection required but also provide it with the mechanical support and attachment points required for some of the embodiments identified above.

The secondary inductive power coil may also have a rigid or flexible ferrite backing that enhances inductive coupling and may also be encased in an environmentally resistant casing such as of plastic or other polymer encapsulation. The secondary coil and device would also be ruggedized and environmental proof, for example at least dust and waterproof.

The secondary inductive power coil would preferably be located on the lower back of the soldier's apparel so that it would align with the primary inductive power coils placed into the seat back. The secondary coil would also be constructed to be as thin as possible using, for example, the same construction methods identified for the primary coil. The secondary coil may be placed into a sleeve on either the outer load carriage vest or ballistic protection vest or other outer garment or apparel. The secondary regulation and charging and controller circuit cooperating with the secondary coil may be located to the side of the secondary coil so as to minimize bulk in the small of the back that would cause discomfort to the soldier.

In some circumstances the use of primary and secondary inductive power co-axial coils with a more cylindrical design for example, a coil winding with a greater height than width, maybe advantageous.

To reduce electromagnetic interference that may be caused by the inductive charging system it may be necessary to place a shield on the back side of the primary and secondary inductive power coils and ferrites using thin lightweight shielding materials such as Mu metal or other high permeability materials.

Although in a preferred embodiment the primary inductive power coil is held securely within or on the seat back, it is advantageous if the position of the primary coil accommodate different sized torsos, as all soldiers are not the same size, and in particular may have different back heights. One way to selectively position the primary coil is too provide the primary coil encapsulation with a vertical height adjustment. The primary coil assembly may be fitted with a fabric strap or webbing secured with a hook and loop fastener that would allow the coil height to be adjusted within a channel on the seat back and then be secured in place. Other elevation means may also be employed to selectively elevate the primary coil assembly.

For seats that need only temporary inductive power and data connectivity a fabric seat cover for example formed as a fabric sleeve, and holding the primary coil assembly, may be slipped over the seat back of a seat and secured in place with straps or elastic.

Other locations that could be used for mounting a primary coil on a troop seat include the seat bottom and bolsters on both the seat bottom and back. A headrest with integrated inductive primary charging and data coils could be used to charge a central battery located on a helmet and communicate data to devices on the helmet.

Notwithstanding the above, it is preferred that users of all heights be able to sit in a seat that is equipped with a means to provide inductive charging and receive a charge or transfer of power and the transfer of data without the user having to make any adjustments, alterations or otherwise change the seating arrangement to enable alignment of the primary and secondary inductive coils. It is not a preferred task given the nature of the environment, which is very much hurried, within a confined space, that must accommodate multiple users at the same time in an extremely stressful and charged atmosphere, for a soldier or occupier of the seat within a vehicle to make an appropriate and exacting adjustment that allows him to receive an inductive charge. Sliding the primary coil up or down within a sleeve on the seat back would be such a manual adjustment.

As a population, the physical height of a user is comprised for the most part in the length of the legs and the length of the back, both of which vary independently of each other form one individual to another. When a user goes to sit in a seat, it is unknown where on the seat the various anthropometric landmarks of the user such as the top of the pelvis, small of the back or shoulder blades will reside in the vertical axis of the seat back. This problem may also be compounded by different seasonal or protective clothing that may be worn from mission to mission. The objective is to be able to transfer inductive power from the seat to a seat occupant, to the majority of the user population with equal efficiency.

Multiple anthropometric studies are available that document the range of torso length that affects the sitting height of an individual. The average male, 67" (170 cm) to 71" (180 cm) with an inseam measurement of 31" (78 cm) to 34" (86 cm), will usually have a torso length measurement of about 17" (43 cm) to 19" (48 cm). The average female, 62" (157 cm)

to 66" (168 cm) with an inseam measurement of 28" (71 cm) to 31" (79 cm), will usually have a torso length measurement of 15" (38 cm) to 17" (43 cm). A 1995 USCM Anthropometric Study found that the sitting height (vertical distance between a sitting surface and the top of the head) for the $1^{st}$ percentile male was 33" (84 cm), the $5^{th}$ percentile male was 34" (86 cm), the $50^{th}$ percentile male was 36" (92 cm), the $95^{th}$ percentile male was 38" (97 cm) and the $100^{th}$ percentile male was 39" (100 cm). This provided a male sitting height variance between the $5^{th}$ and $95^{th}$ percentile of 4" (10 cm).

For the female population, the $1^{st}$ percentile female was 31" (78 cm), the $5^{th}$ percentile female was 31.5" (80 cm), the $50^{th}$ percentile female was 34" (86 cm), the $95^{th}$ percentile was 36" (91 cm) and the $100^{th}$ percentile female was 36.6" (93 cm). This provided a female sitting height variance between the $5^{th}$ and $95^{th}$ percentile of 4.5" (11 cm). When the male and female populations are combined, the sitting height variance between the female $5^{th}$ percentile and male $95^{th}$ percentile is 6.7" (17 cm).

It can be assumed that for any given individual the vertical location of the secondary power coil relative to the sitting surface is a static distance, however given a population of users, there is a range of individual static distances that must be accommodated. This range of sitting height is too great to accommodate with a single primary power coil coupling to a single secondary power coil. Although small lateral and vertical displacement can be accommodated using modified coil shapes such as elliptical or other geometries, the sitting height variance is too great to be efficiently accommodated with the coil geometry of a single coil alone.

As discussed above, one method of providing height adjustment is to manually move the primary inductive power coil within a vertical sleeve within the seat back. The primary power coil can then be positioned to be in the correct vertical position to align with the vertical position of the secondary coil located on the user. A preferred embodiment however, is to provide a means of accommodating the user population by incorporating an array of multiplexed primary power coils that are embedded within the seat back. The multiplexed coils may be arranged in a simple one dimensional vertical line, or be an array comprised of multiple coils in both the x and y axis or a matrix of primary coils in two dimensions to provide enhanced lateral inductive coupling. The statically positioned inductive array within the seat back may be designed such that it can accommodate and couple to the location of a secondary inductive coil that encompasses the range of heights created by the entire population of users or for a limited range of population, example between the $10^{th}$ and $80^{th}$ percentile of population heights. The seat occupant requires only a static secondary coil assembly comprised of an individual or multi-coil configuration, that is located on the rear of his or her outer garment and that can then inductively couple with one primary power coil within the primary power coil array that provides the best alignment and therefore the best power efficiency.

The geometry of the primary inductive coil power array is such that within the array, multiple coils partly overlap such that regardless of the height of the user, one of the primary coils will be located adjacent to the secondary inductive power coil of the user. This allows the resonant circuit characteristics of the inductive coupling between the secondary coil and any given primary coil to always be maintained within the optimal driving circuit range for the inductively coupled transmission of power and/or data. The primary coils can be of many geometries including circular, hexagonal or other polygonal shape and may also include ferrite backing. A vertical array of elliptical coils, where the major axis of the elliptical coils is horizontal to provide a higher geometrical coupling than a circular coil shape may be used to enhance lateral coupling, while the vertical overlapping of multiple elliptical coils in the vertical axis forming the vertical array, allow for height variation of the seat occupant.

Alternatively to compensate for greater lateral offsets, the primary coil array be comprised of for example, two or three or more vertical columns or a matrix of coils that also may be a variety of geometries.

The primary inductive drive circuit would be comprised of the primary power inductive drive system as previously described, with the addition of a sensing circuit controller and a multiplexer switch connected between the AC drive output and the primary inductive power coil array. When power is applied to the primary drive, the sensing circuit controller sequentially connects and disconnects the AC resonant power signal to the coils via multiplexer, looking for a coil whose resonant circuit characteristics meet those defined for the system when the primary coil is mutually coupled to a secondary coil. When a primary coils is detected whose resonant circuit characteristic falls within the parameters allowed by the sensing circuit, then the primary AC drive power is maintained to that primary coil and continuous electrical power is inductively transferred from the primary coil to the secondary coil. When the secondary coil is moved away from a primary coil within the array, the primary drive circuit would initiate another search through each of the array coils until another optimal primary coil is identified for full power transfer. Methodologies for constructing and controlling primary inductive arrays are discussed with the Wireless Power Consortium specifications.

At a more complex level of implementation, it would be possible to have a multiple of primary drive circuits that drive different parts of the coil array. Coil arrays could also be located on different parts of the seat other that the back to connect to secondary coils that may be located on other parts of the occupants body.

Thus, in an alternative embodiment of the present invention, the primary power coil assembly on the seat, such as in the seat back, may be an array of coils to accommodate a range of user torso heights and sitting positions.

In conjunction with the provision of power, existing troop umbilical cables also provide communications and data to the soldier. Communications may be audio communication to the vehicle crew, battlefield command relayed through the vehicles radio network. Data can include up and downloads for C4I, GPS position data or simply external video feed from the vehicle so that troops know what to expect when they disembark as previously discussed. For the soldier to be truly un-connected or wireless from the vehicle when seated, the communications and data or communications data must also be provided wirelessly to the soldier. Therefore communication data transmission includes the ability to transmit and receive, voice or audio, text, data, still images and streaming video or any other data format. One way this can be done, without using radio frequency data transmissions, is to also use inductive data transmission from the seat to the soldier. The data received by the secondary data coil and decoding circuits located on the soldier would be sent from the decoding processor circuit either directly to the soldiers data receiving devices or via the central distribution hub or computing component.

The primary data and secondary communication data inductive coils may be placed as separate entities or coil assemblies from the inductive power charging coils, the data coil assemblies having a distinctly separate central axis that provides optimal inductive data coupling than the axis used by the inductive power coils. The primary and secondary communication data coils may also be integrated into the inductive power coil assemblies so that only one combined encapsulated coil assembly needs to be located on the seat back or on the back of the soldier.

For example, inductive communication data may be transmitted by an inductive coil and driver circuit when a microprocessor within the drive circuit sends data encoded for serial transmission to a data driver that creates a high frequency fluctuation of the coil voltage across the tuned LC circuit, producing a modulated signal. The modulated signal is transmitted by the primary side coil across the inductively coupled link to the secondary coil which receives the modulated encoded AC signal that is then decoded back to serial data. Simplified block schematics are provided in FIGS. 10 and 11.

Two coil arrays on the primary side and two coils on the secondary side of the inductively coupled circuit may be employed for both power and data transmission and reception. On the primary side of the inductive circuit one array of power coils would provide power transmission and an array of data coils would provide data transmission to their respective inductively coupled secondary coils. The separate primary array of power coils may be used for power transfer at a primary frequency 'A' while the secondary array of data coils operating at a secondary frequency 'B' may be used for data transfer. This allows each of the power and data circuits to be optimised electronically for each function.

Typically inductive power is transferred at a lower resonant frequency and transmission of inductive data at a higher frequency. For example the power frequency may be 125 khz while data is transmitted using the high frequency band of 13.56 Mhz, which allows for high data rate throughputs.

As with inductive power transfer, inductive data transfer also works within the near field or more specifically the radian sphere. For typical operating frequencies of 13.56 MHz which has a wavelength of 22 m, inductive coupling occurs no further than the near field—far field transition which is approximately defined as $\lambda/2\pi$ (Lambda/2×pi) or a theoretical maximum range of 3.5 m for a 13.56 MHz frequency. In practise because of the low power levels utilised and that the magnetic field attenuates at a rate following the inverse cube law, a practical low power device has a range limit of one meter (1 m).

One method that may be employed to establish a high frequency inductive data link would be to use near field communication (NFC) technology which employs modulated inductive frequencies to enable connectivity between coupled devices. A considerable benefit of near field communication is that it removes the need for user intervention to establish pairing between devices. In a standard commercial application, once two NFC devices have been brought within close sufficient proximity to enable automatic handshaking and pairing between devices, they may then be separated up 10 cm while maintaining NFC peer-to-peer communication. For the NFC data communication between a seat and a seated occupant within a vehicle, the same handshake protocols would be employed to initiate pairing and communication to the vehicle once a soldier is seated, however additional NFC signal amplification would be implemented to allow communication to 1 m of range. In practise, the soldier would sit in the seat and by coming within a few centimeters of the seat back, allow the primary and secondary data circuits to handshake and establish a communications link. The soldier is then be able to move around in his seat with practical separation distances of up to 50 cm without breaking the inductive data link. The inductive data link provides a greater latitude of movement for the soldier than when the soldier is connected to a communications data stream via an umbilical cable and connector. In addition the soldier can move around and quickly make, break and remake data links within only a couple of seconds, without having to physically disconnect and reconnect an umbilical cable which as discussed earlier presents considerably more difficulty.

NFC technology was originally developed by Phillips™ and Sony™ and is based on the ECMA 340 standard. ECMA 340 specifies a magnetic induction interface operating at 13.56 MHz and with data rates of 106, 212, 424 kbps and if required 848 kbps or higher. The technology was originally developed to transfer data between cell phones themselves, or cell phones and embedded smart tags, data terminals for sale transactions or between computers and other electronics such as TVs or media players.

Its application for data transfer between an occupant and a seat has not been previously envisioned, whereby the occupant connects to the seat's data driver simply by sitting in the seat, the primary and secondary circuits coming within proximity and connecting within preferably less than one second. The NFC system would be operated in active communication mode (versus passive) where both the primary (initiator) and the secondary (target) can communicate with the other by alternately generating their own inductive data field in a half-duplex peer-to-peer mode.

An inductive data communication system that uses the 13.56 MHz frequency range is allowed by national and international communication regulatory agencies such as the FAA or in Europe the European Conference of Postal and Telecommunications Administrations (CEPT) that have set aside specific frequency ranges for applications such as industrial, scientific or medical applications, for very short range devices (SRD), ISM frequency ranges (Industrial-Scientific-Medical) as well as various RFID industry conformance standards and protocols.

Using a minimum of components and a single frequency band the inductive data transfer circuits will be able to support half duplex bidirectional communication. With more elaborate circuitry a wider communication band width it may be able to support full duplex bidirectional communication.

Building on existing standard for data rates of 848 Kbps, future Very High Data Rate (VHDR) components may provide over 10 Mbit/s secure data transfer. VHDR is not currently supported by NFC protocols or standards. Work conducted by NXP and others over the last few years has realized data rates of 6.78 Mbit/s. The existing NFC standards and product utilise the principle of encoded ASK (amplitude shift keying) load modulation, which does not provide for sufficient separation within the data transmission pauses to provide for higher data rates than 848 Kbits/s. Applied NFC VHDR research has determined that if the modulation is changed to PSK (phase shift keying), which is currently unsupported by the NFC standard, then data rates of 6.78 Mbit/s are reliably obtained allowing the wireless inductive transmission of compressed video data streams.

In designing a magnetically coupled data transfer system, one has the choice of implementing any one of a large variety of modulation and encoding formats. Typical modulation methods would use, but are not limited too ASK (Amplitude Shift Keying) or other standard formats and iterations such as FSK (Frequency Shift Keying), OOK (On-Off Keying), PSK (Phase Shift Keying) and DPK (Differential Phase Shift Keyed) etcetera.

Encoding of the data stream could also be performed by many existing methods including but limited too Manchester, Miller, PIE and their variants.

As would be known to one skilled in the art, of the data transmission protocols available, careful evaluation has to be made of the types of protocols used as for example with amplitude modulation. This is because the distance between the primary and secondary will vary for most devices and therefore the amplitude of the signal received by the secondary coil will always be fluctuating in amplitude and may be interpreted as incorrect transmission of data if improper voltage thresholds were to be used.

A significant requirement for inductive data transfer would be that it not interfere with conventional military or civilian radio transmitters and receivers. Again because the inductive coupling according to the present invention is operating in the electro-magnetic frequency spectrum it would not cause interference with devices operating in RF spectrum.

Due to the fact that inductive coupling uses the electromagnetic spectrum it does not interfere with RF communications, nor can it be jammed by RF. Therefore, when in an RF denied area whether to prevent the triggering of IED or otherwise, inductive power and especially inductive communications and data transmission would be unaffected.

The data receiver coils may utilise a three-dimensional ("3D") coil so that conditions are optimised for it to receive a signal via the magnetic flux when not aligned parallel to the primary coil. For communication through a seat back a 3D coil assembly may not be necessary as the send and receive coils will be both substantially accurately aligned and predictably aligned, suiting the use of a simpler two-dimensional coil architecture such as that used for the inductive power transmission coil. FIG. 12 shows example configurations of the coil assemblies or antenna for the transfer of both inductive power and data and FIG. 16 for the transfer of data only.

In addition to planar coil configurations, the inductive data or NFC coils may be a three dimensional orthogonal antenna, and be constructed from any of the multitude of rigid or conformal antenna technologies available including air backed, ferrite backed, ferrite rod and ferrite core.

Coil geometry for either the primary or secondary inductive data coil may be a three-dimensional (3D) coils such to optimise signal reception between the primary and secondary coils if they are not aligned on a common central axis. Three-dimensional coils may include but not be limited to for example, a three axis ferrite rod assembly, cubic or rectangular form, a spherical 3D coils or other 3D coil geometries.

DETAILED DESCRIPTION OF FIGURES

In the drawings wherein like reference numerals depict corresponding parts in each view:

FIG. 1 is representative of an existing prior art cabin 1 of a vehicle such as a light armoured personnel carrier, aircraft, or vessel equipped with either group seating 3 or other seating arrangements. Connected to the vehicle power and data bus 2 are further cables or umbilical 2a to transmit power and/or communication data around, over or otherwise to the soldier 10 or other occupant, via a conductive electrical system connector 2b on for example the occupants vest or other attire.

Figure 2:
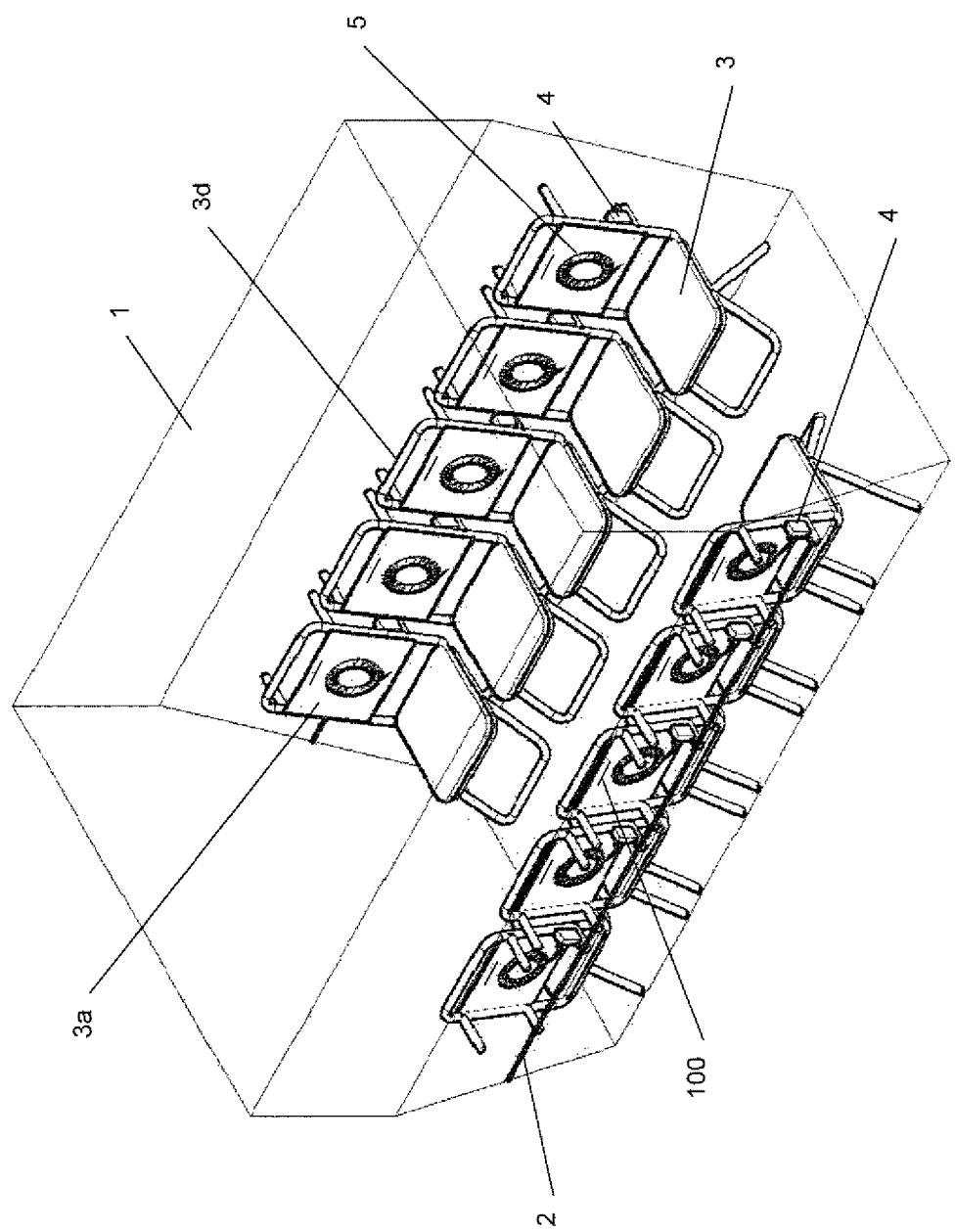
FIG. 2 illustrates the conventional troop seating configuration of FIG. 1 wherein the seat backs each have integrated primary inductive charging and inductive data transfer components.

FIG. 2 provides detail of a vehicle cabin 1 that is equipped to wirelessly transmit inductive power and data from the seat 3 to the occupant of the seat. The seat back 3a containing the primary inductive power coil assembly 5 and inductive communication antenna 100 is typically mounted on a seat frame 3d. The primary drive and processing electronics module 4 for both the inductive power and inductive data system is attached to the frame of each seat in close proximity to the seat back and obtains its electrical power, data and communications from the vehicle power and data bus 2.

Figure 3A:
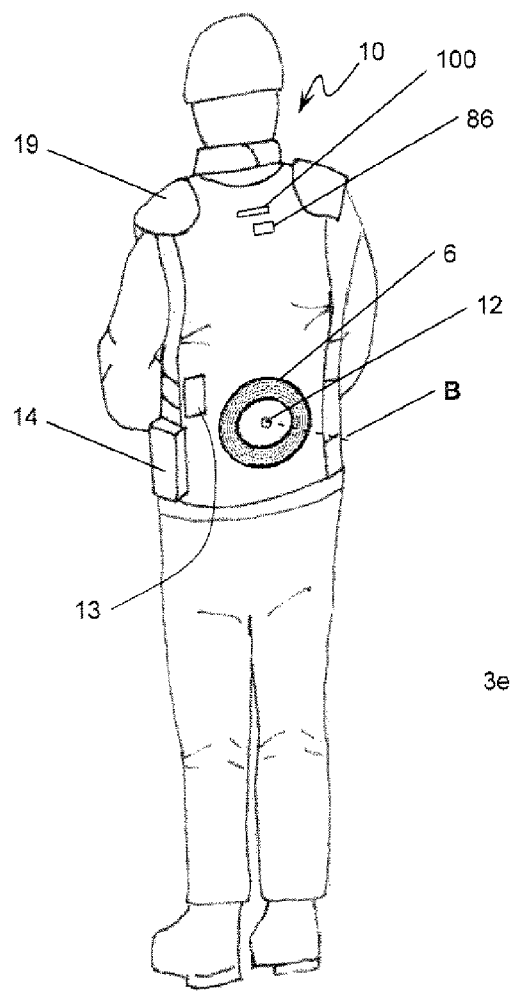
FIG. 3a illustrates a standing soldier wearing torso-covering apparel having secondary inductive power and inductive data receiving coils, a charging circuit and a central or main rechargeable battery integrated into a load carriage vest or tactical ballistic vest.
Figure 3B:
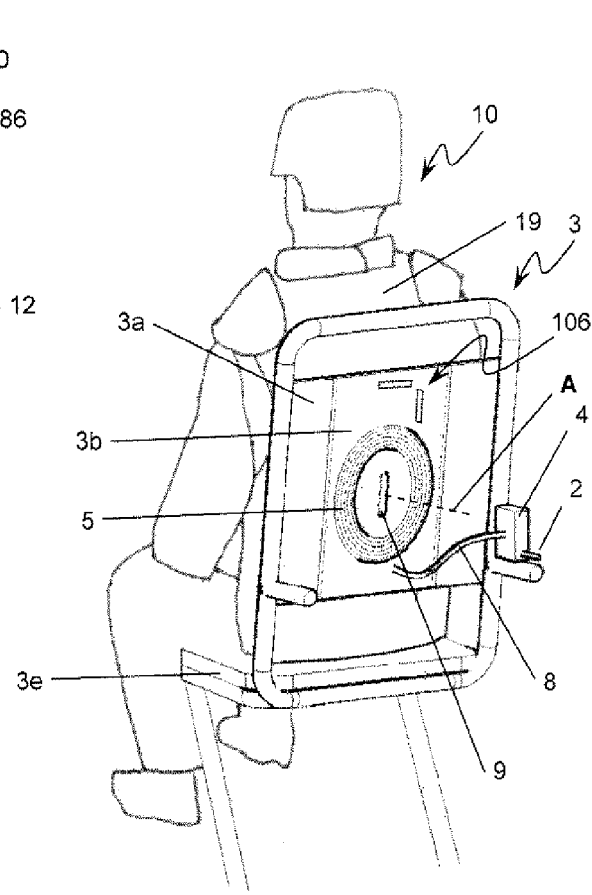
FIG. 3b illustrates a soldier wearing the inductive vest as seen in FIG. 3a, sitting in one of the vehicle seats of FIG. 2 so as to receive wireless power and data from the seat via the primary inductive power and inductive data sub-systems incorporated into the seat back.

FIG. 3a is a rear view of the seat occupant 10 wearing apparel 19 equipped with secondary inductive power coil assembly 6 with central axis B that is connected to a secondary voltage conditioning, and battery charger module 13 that provides charge to a central or main soldier system battery 14. The central battery can be conformal such as a chest plate or be a separate entity and be mounted anywhere on the occupants apparel. An optional proximity sensor trigger 12 is shown centered within the secondary inductive power coil. The secondary transmit/receive inductive data antenna 100 is mounted on the upper back across the shoulder of the seat occupant with the inductive NFC data communications drive and processing module 86 mounted in proximity, which in turn would be connected to the soldier system central computing device or individual electronic devices requiring a data communication capability. FIG. 3b shows the seat occupant 10 seated in a seat 3 equipped with a wireless inductive power and data transfer capability. Power and communications data from the vehicle bus 2 is provided to the primary power and data drive module 4 which in turn is connected by cable 8 to the primary inductive power coil 5 and an L-shaped 2D inductive data coil or antenna assembly 106, that are located within a sleeve 3b or other mounting facility on the seat back 3a. The central axis A of the primary inductive power coil 5 is in close alignment with the central axis B of the secondary inductive power coil 6 on the apparel 19 of the seat occupant 10. The optional proximity sensor 9 is shown located within the primary inductive power coil and would be triggered by the proximity sensor trigger 12 located within the secondary coil.

The primary and secondary inductive coils in FIGS. 3a and 3b show a seat back centric system, the inductive power and data coils could also be mounted in the horizontal seat support 3e with mating secondary coils in the thigh of the occupant for example.

Figure 4:
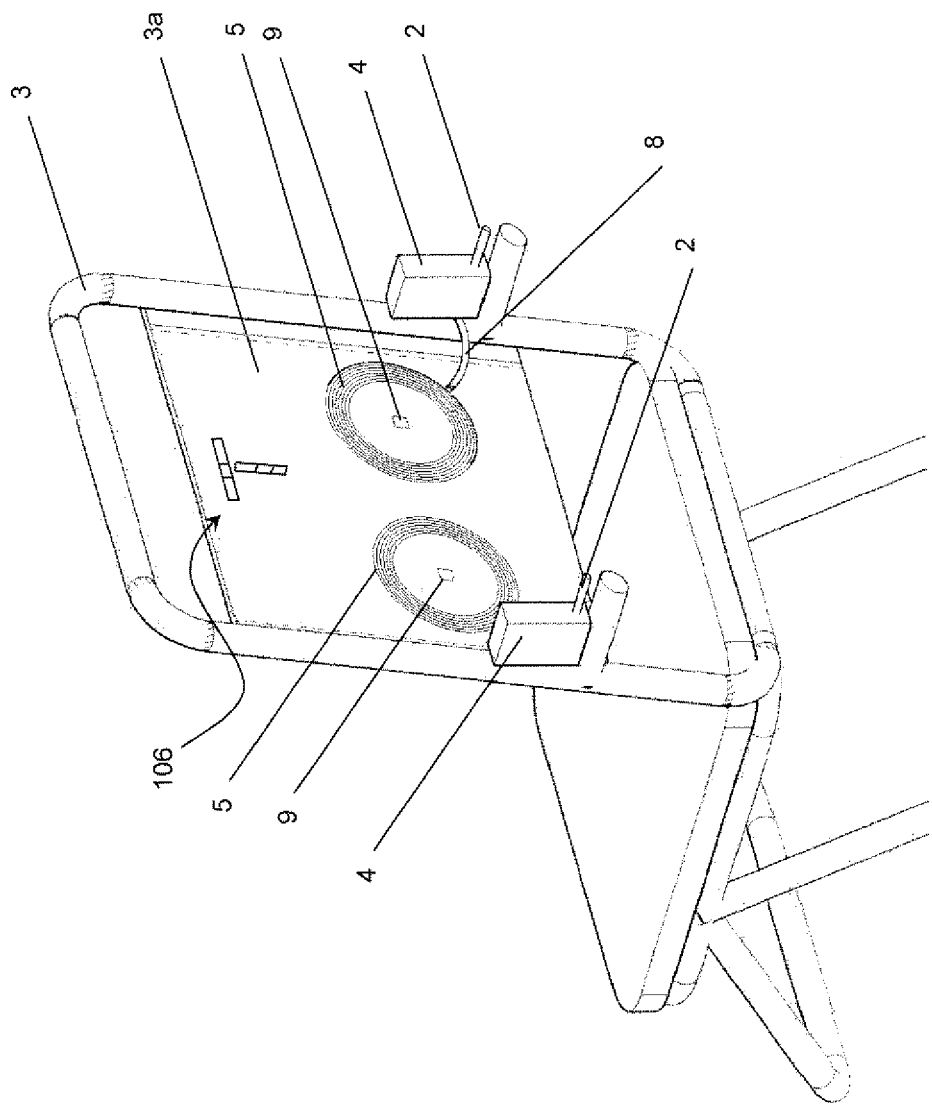
FIG. 4 illustrates an alternative embodiment of the seat of FIG. 3b a wherein the seat back has two primary power inductive drive circuits powering two independent primary coils in a side by side configuration, each having proximity sensors, and with a separate inductive data communication coil located in the upper portion of the seat back.

FIG. 4 shows a seat 3 and seat back 3a with an alternative primary inductive power coil 5 configuration where two coils are placed side by side. Each power coil 5 is depicted with its own primary power inductive drive circuits 4 powering the two independent primary coils in a side by side configuration, each having proximity sensors 9. A separate inductive data communication T-shaped 2D coil assembly 106 located in the upper portion of the seat back 3a would transmit, receive data processed within a primary module 4 that in turn is connected to the vehicle power and data bus 2.

Figure 5B:
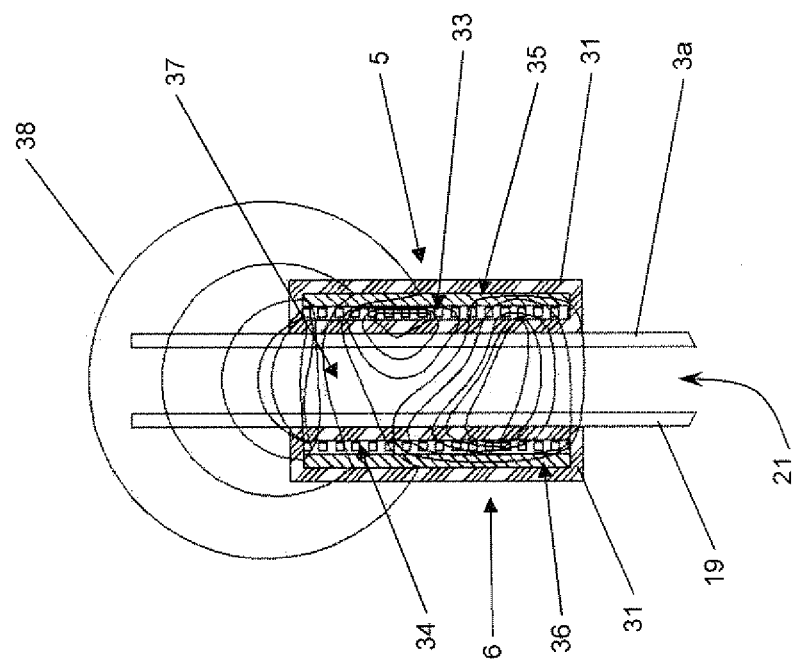
FIG. 5b is a cross-section laterally through a ferrite-backed inductive power primary and secondary coil pair, wherein the cross-section is oriented and located such as seen in FIG. 8, showing the magnetic flux lines produced by placing an alternating current through the primary coil, and illustrating how the ferrite-backed coil by minimizing flux leakage (magnetic flux lines whose path is outside the useful or intended magnetic circuit) has a much higher coupling efficiency than in the coil in FIG. 5a, where the magnetic flux generated in the primary coil does not pass through the secondary coil.
Figure 5A:
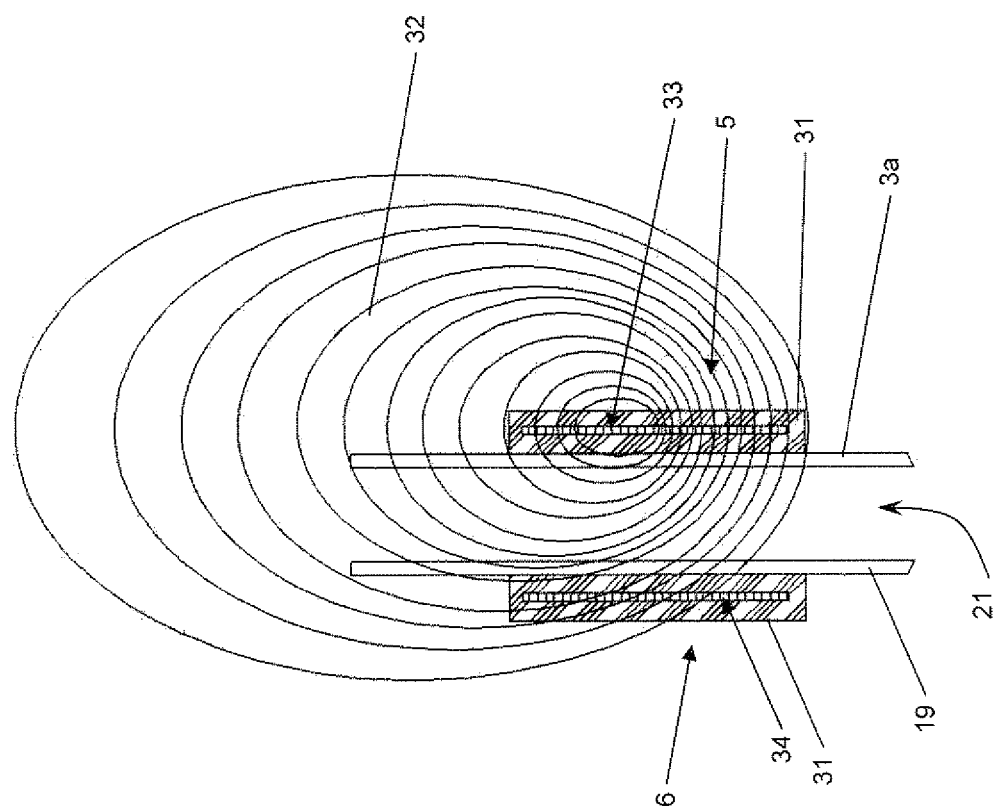
FIG. 5a is a cross-section laterally through an opposed facing inductive power primary and secondary coil pair mounted on a seat back and an apparel respectively, wherein no ferrite backing is provided for the coils.

FIG. 5a, is a cross-section through the windings of a primary inductive power coil assembly 5 mounted on a seat back 3a and a secondary inductive power coil assembly 6 mounted within a user garment 19. The primary coil windings 33 of the primary inductive power coil assembly 5 and the secondary coil windings 34 of the secondary inductive power coil assembly 6 are both encapsulated 31 in a flexible or a rigid polymer so as to provide isolation and protection from the surrounding environment. Magnetic field flux lines 32 are representative of those characteristic of an air backed that is, that does not have ferrite backing, inductive primary power coil 5 that is energized with an alternating current, and creates a reduced inductive coupling to a secondary inductive power coil 6 that is separated from the energized primary inductive power coil by an air gap 21.

The primary 5 and secondary 6 inductive power coil assemblies, may also have included within the encapsulation 31 ferrite backings 35 and 36 behind the primary and secondary coils 5 and 6 respectively. In contradistinction to the air backed inductive coils of FIG. 5a, the ferrite backed inductive coils of FIG. 5b have a characteristic higher concentration of magnetic flux 37 corresponding to more highly coupled primary and secondary inductive coils so that only a limited amount of stray inductance or flux 38 is found.

Figure 6:
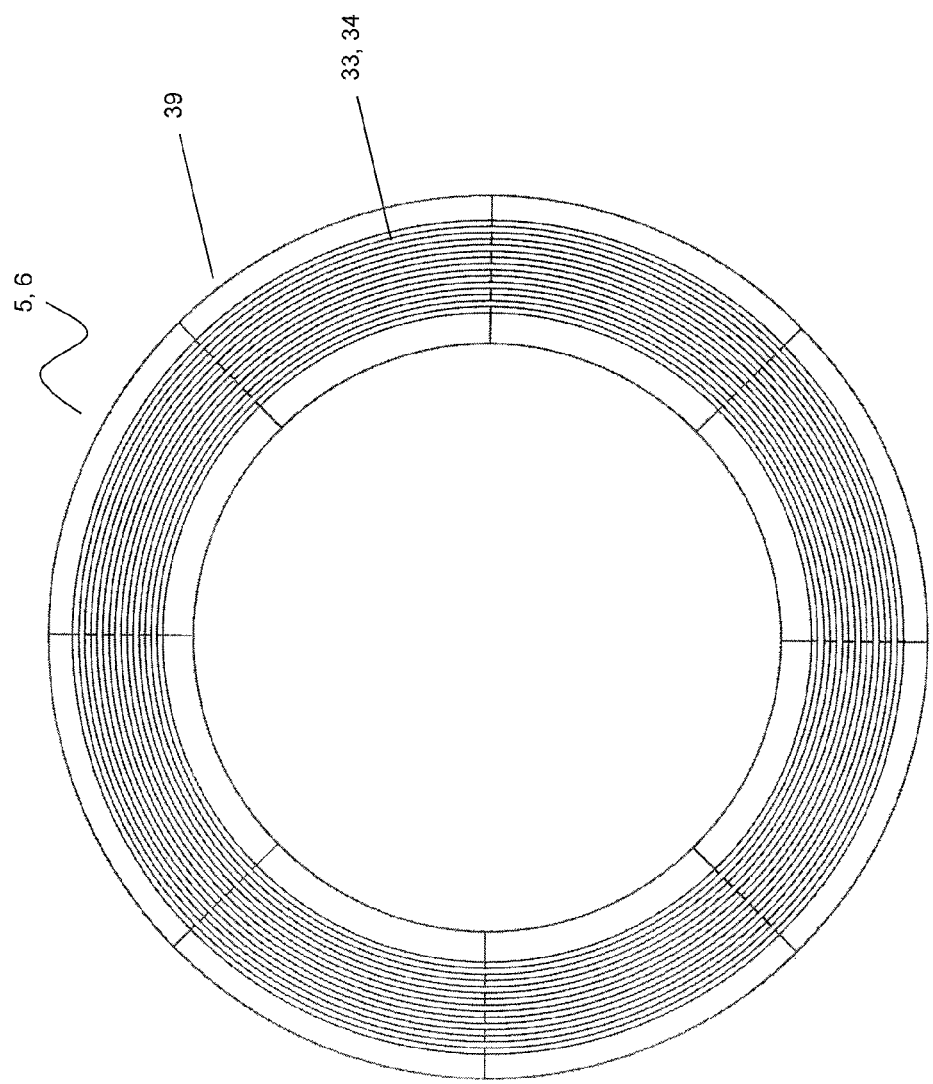
FIG. 6 is a plan view of segmented ferrite for either a primary or secondary power or data coil so as to provide movement and flexibility for the coils wherein the segments may be backed with Mu metal or flexible shielding and are encapsulated in a flexible polymer.

A diagram of a primary or secondary inductive power coil assembly 5, 6 is shown in FIG. 6, where the primary or secondary coil windings 33, 34 are assembled with a backing of a magnetic material such as magnetic composite or ferrite comprised of multiple individual segments 39, that provide a measure of flex or compliance to the coil assembly 5, 6.

Figure 7:
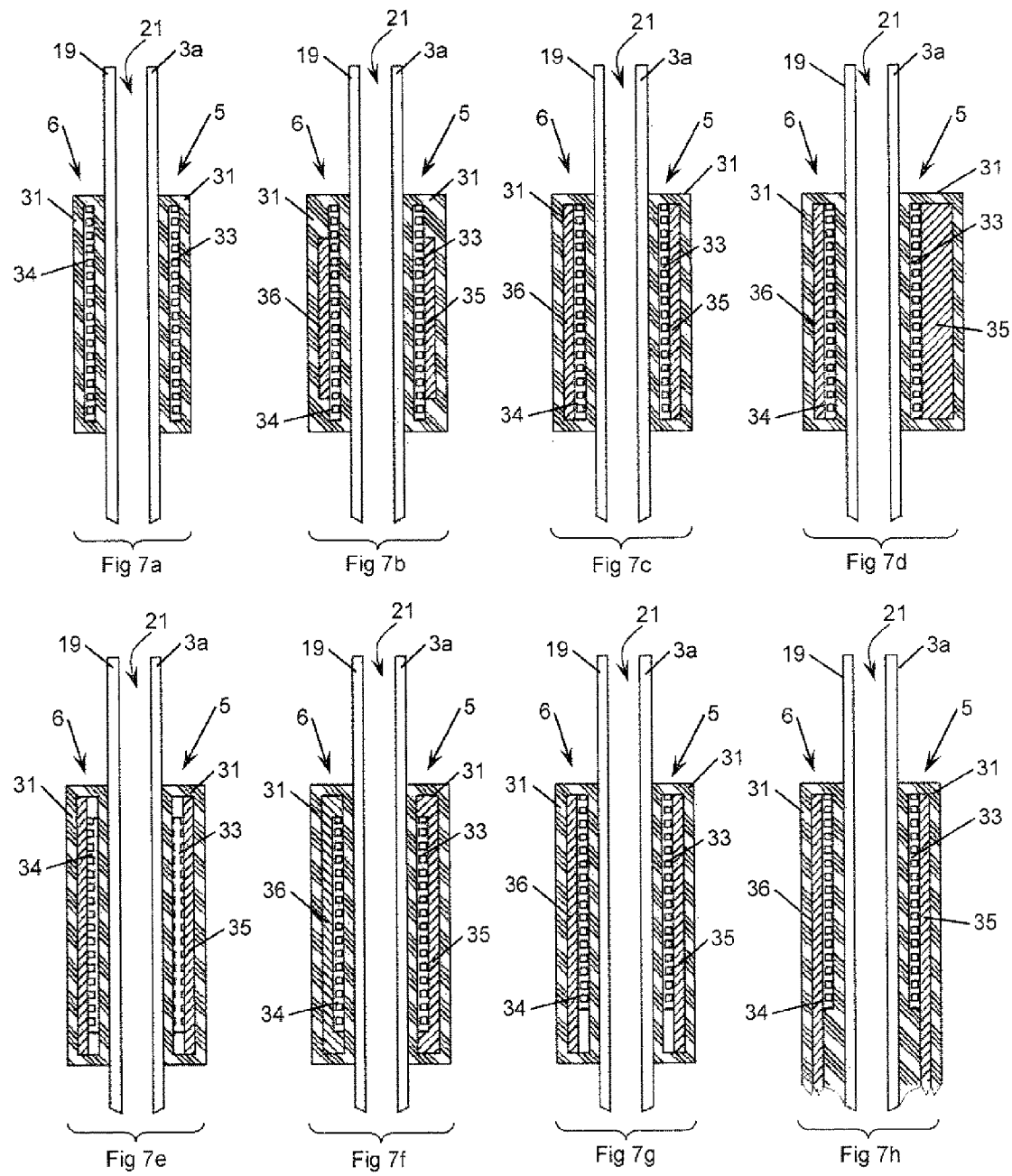
FIG. 7a is, in cross-section view through one side of a primary and secondary pair of opposed facing inductive power coils mounted, respectively, on a seat back and back portion of a torso-covering piece of apparel.
FIG. 7b is the cross-section of FIG. 7a wherein the primary and secondary inductive power coils have ferrite backing rings which are centered on and cover less than the total surface area of the corresponding coils.
FIG. 7c is the cross-section of FIG. 7b wherein the ferrite backing rings have substantially the same area as the corresponding inductive power coils.
FIG. 7d is the cross-section of FIG. 7e wherein the ferrite backing ring backing the primary inductive power coil is of greater thickness than the ferrite backing ring backing the secondary inductive power coil.
FIG. 7e is the cross-section of FIG. 7c where the area of the ferrite backing rings is larger than that of the primary and secondary inductive power coils.
FIG. 7f is, in partially cut away cross sectional view, an enlarged portion of FIG. 8 and illustrating the primary and secondary inductive power coils embedded within channel shaped ferrite backing rings.
FIG. 7g is the cross-section of FIG. 7e with the windings of the primary and secondary inductive power coils displaced radially outwardly to be flush with the outer diameter of the ferrite backing rings.
FIG. 7h is the cross-section of FIG. 7g wherein the ferrite backings are ferrite discs.
Figure 8:
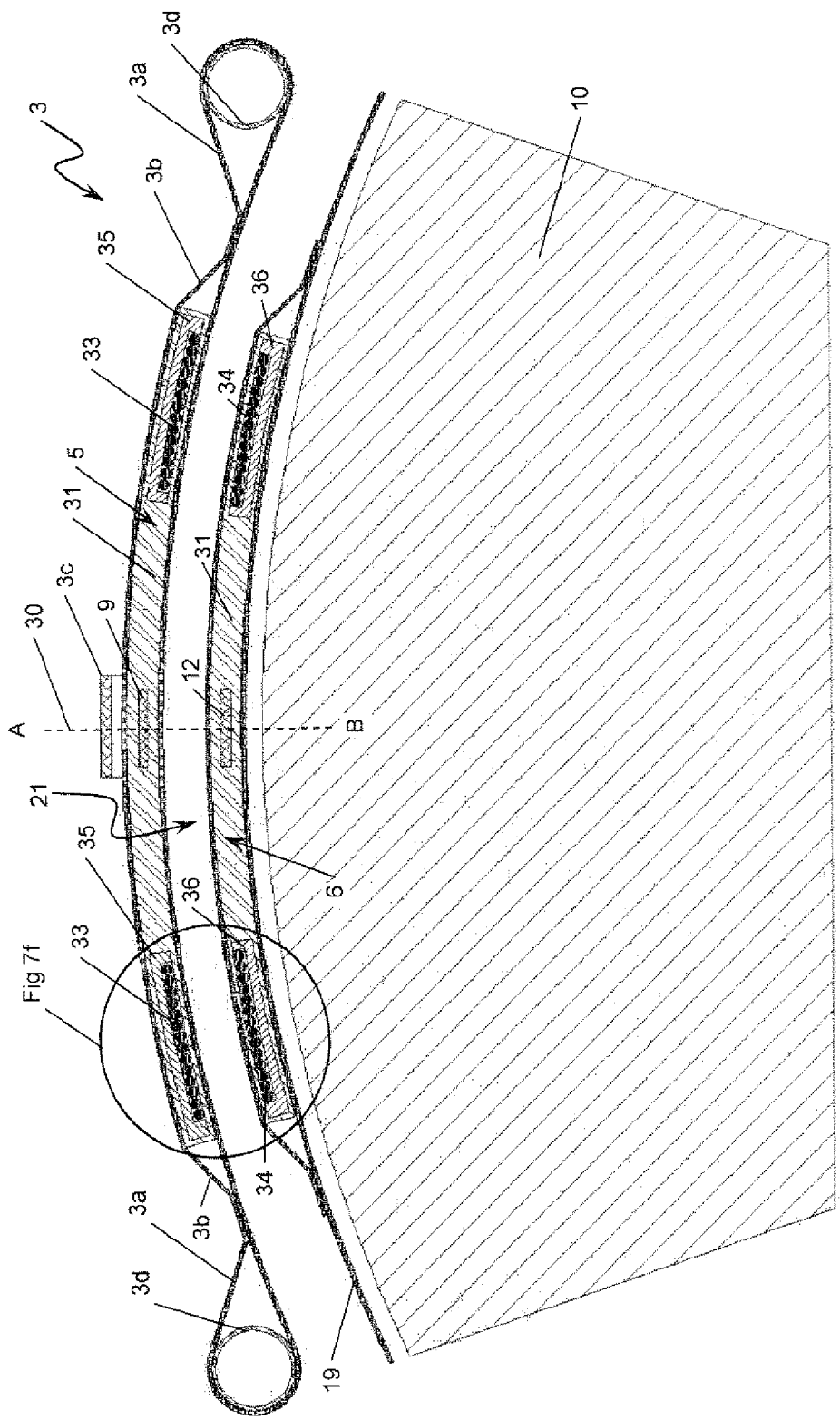
FIG. 8 is a lateral cross-section along line 8-8 in FIG. 9b, showing a fabric sling seat back formed as a sleeve containing a conformal planar primary inductive power and inductive data coil assembly with a proximity sensor, and a secondary power and inductive data coil integrated into load carriage apparel worn by a soldier and which has been brought into proximity with the primary power and data coil assembly in the seat back.

FIG. 7a shows a partially cutaway coil assembly cross-section which corresponds to that of FIG. 5a, that is, where the primary and secondary inductive coils do not have a ferrite backing. FIG. 5b is a partially cutaway cross-section wherein the primary and secondary coils have equal coverage and equal thickness of ferrite backing. FIG. 7b is a further exemplary illustration of the primary and secondary inductive coils, in this case, having reduced coverage ferrite backing as compared to that of FIG. 7c for example. FIG. 7d illustrates the example where ferrite backing 35 is thicker than ferrite backing 36, that is, wherein the primary and secondary coils have equal coverage of ferrite backing but wherein the ferrite backing is thicker behind the primary coil. FIG. 7e illustrates where the primary and secondary inductive coil windings are each centered on a corresponding larger ferrite backing. FIG. 7f, which corresponds to FIG. 8, illustrates the example wherein the primary and secondary coils have windings embedded within corresponding ferrite channels. FIG. 7g illustrates the example wherein the primary and secondary coils have their windings displaced to the radially outer diameter of the ferrite backing, keeping in mind that the illustration of FIG. 7g (and all the others cross sections of FIGS. 7 and 12) is merely a section of one side of the opposed facing pair of primary and secondary coils. FIG. 7h illustrates the exemplary embodiment wherein the primary and secondary inductive coils each overlay a corresponding solid ferrite disc backing. There are other geometric iterations of ferrite backing and combinations of backing materials that can be used for the application.

Figure 9A:
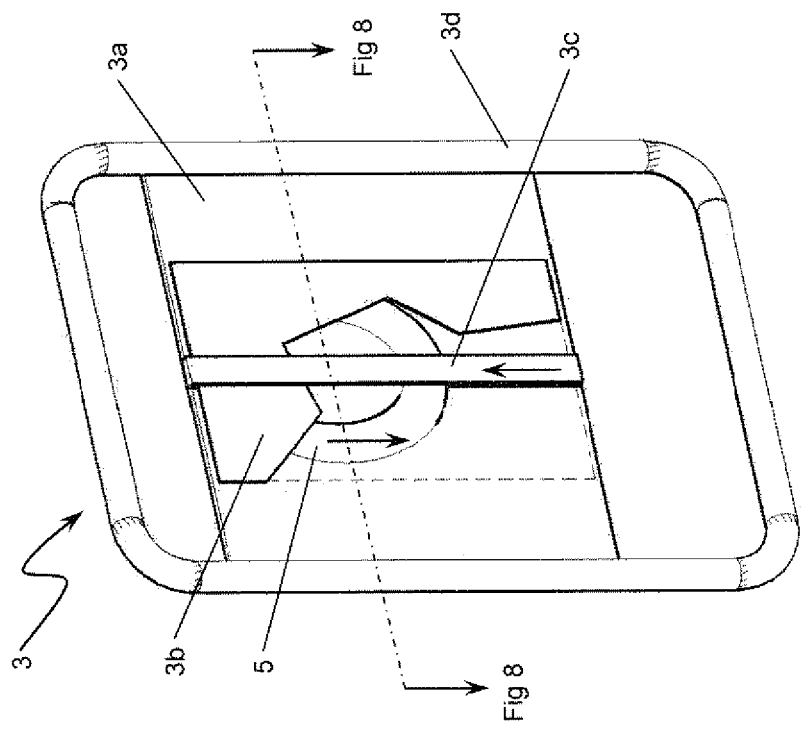
FIG. 9a is, in partially cut-away rear perspective view, the seat back embodiment of FIGS. 8 and 9b wherein the primary inductive power coil assembly is in its lowered position awaiting elevation by the pulling downwards of the vertical webbing strap attached in a loop to the primary coil assembly.
Figure 9B:
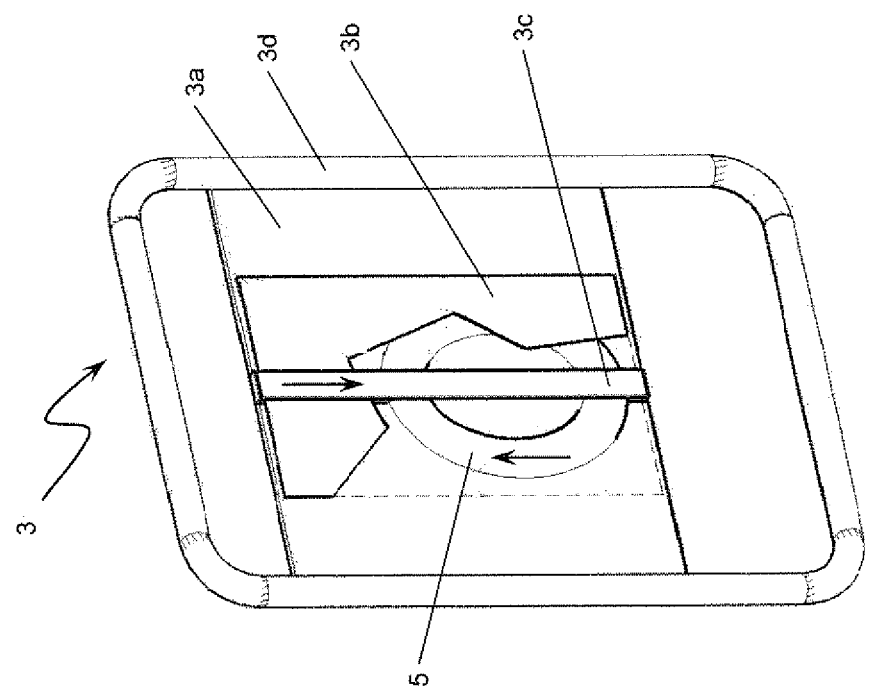
FIG. 9b is the seat back of FIG. 9a wherein the primary inductive power coil assembly has been raised and is awaiting lowering by the pulling upwards of the webbing strap.

FIG. 8 is a section view through the central axes A-B shown in FIGS. 3A and 3B for the seat back mounted primary power inductive coil and the secondary inductive power coil integrated into the users apparel. The primary coil assembly 5, comprised of the primary coil windings 33, ferrite backing 35 and coil assembly environmental encapsulation 31, with optional proximity sensor 9 are integrated into a textile, plastic or other non-magnetic upholstery material sleeve 3b, channel or other containing structure on the seat back 3a which is attached to the frame 3d or supporting structure of the vehicle seat 3. A strap 3c can be used to position the coil assembly in the vertical axis as shown in FIGS. 9a and 9b. The primary power coil assembly 5 within the seat back 3a is separated from the secondary power coil assembly 6 that is contained within the occupants 10 apparel 19 by an air gap 21. The secondary inductive power assembly 6 contains the secondary coil windings 34, secondary ferrite backing 36, optional proximity trigger 12, all of which is environmentally encapsulated in a flexible or rigid polymer 31 or other suitable non-magnetic material.

FIGS. 9a and 9b illustrate a method to raise and lower the primary inductive power coil assembly 5 within a sleeve or channel 3b that is a part of the seat back 3a that allows controlled vertical movement and positioning of the primary inductive power coil assembly by pulling on the strap 3c to allow for optimal alignment with the secondary inductive power coil, whose height from the seating surface is determined by user physique.

Figure 10:
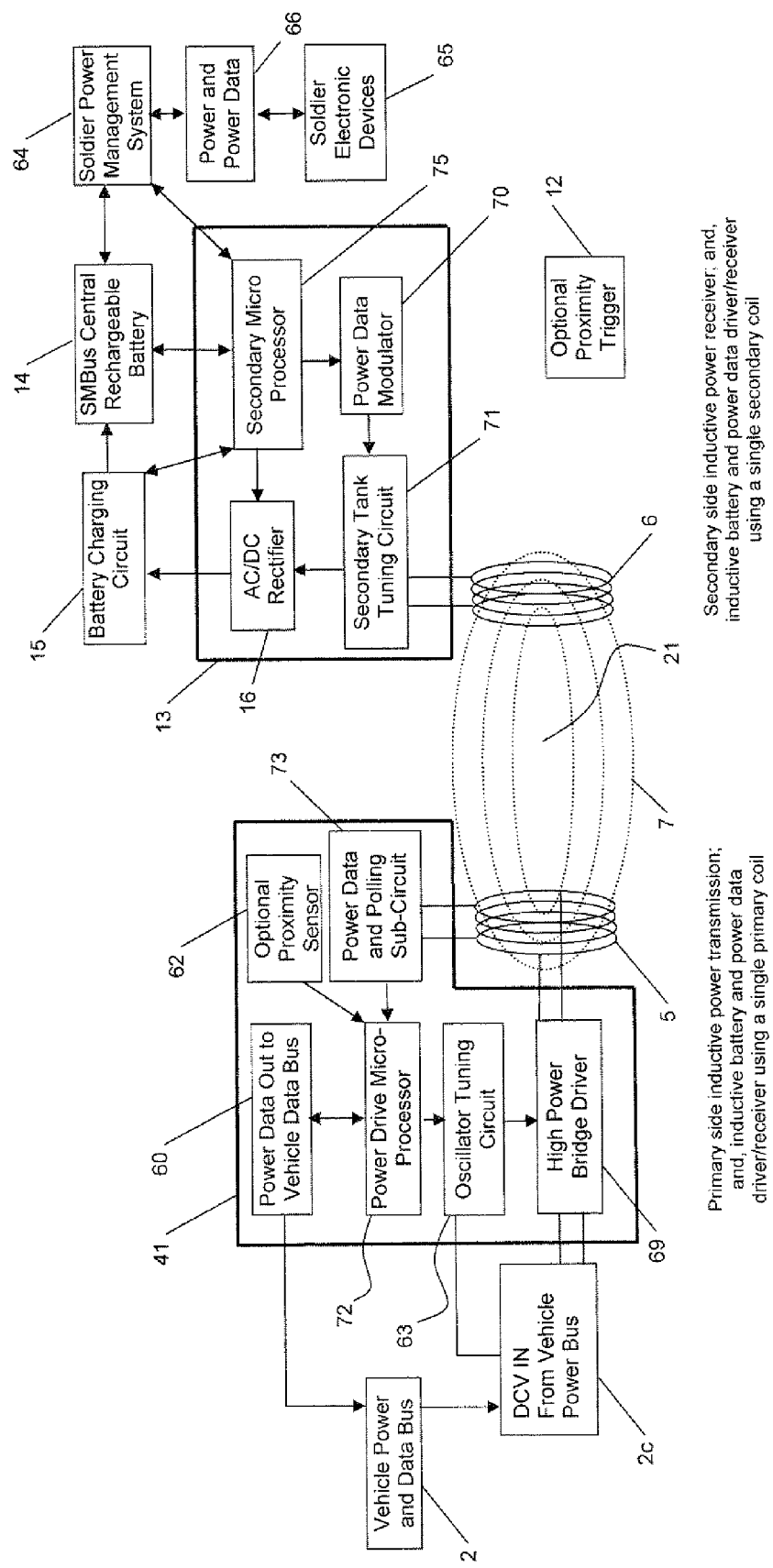
FIG. 10 is a simplified schematic block diagram showing inductive power and power data transfer using a single inductive power coil on each of the primary and secondary sides.

FIG. 10 illustrates a schematic block diagram where power and power data is transferred inductively using a single primary coil 5 and corresponding single secondary coil 6. In FIG. 10, the primary inductive power circuits are to the left of the magnetic flux lines 7 and the secondary circuits are to the right of the magnetic flux lines 7. Magnetic flux lines 7 illustrate the magnetic flux inductive coupling across the air gap 21 between primary inductive power coil 5 and secondary inductive power coil 6. On the primary side, an electric, typically DC power source 2c from the vehicle power and data bus 2 provides power to the primary inductive power drive module 41 which contains sub-circuits including but not limited too, auto tuning oscillator sub-circuit 63; system micro-processor 72 for system control and proximity detection and power data processing; bridge driver and tank circuit 69 of which the primary coil 5 is the inductive element; and, the power data and polling sub-circuit 73. The system microprocessor 72 cooperates with the various sub-circuits so that the main drive power is only enabled when the secondary inductive side is in proximity, whether detected by a polling routine or proximity sensor 62. With the high power bridge driver 69 enabled, alternating current drives coil 5 so as to inductively couple with the secondary coil 6 across magnetic flux 7 and induce a voltage and current in the secondary coil. Power data 60 for the soldier system can be provided to the vehicle data bus 2 via the power data input/output circuit. The power system is placed at the correct resonant frequency to optimise inductive coupling between the primary and secondary power coils by the auto-tune circuit.

On the secondary side, the alternating current produced by secondary inductive coil 6 via magnetic flux 7, is received by the secondary power and power data circuit 13 where the AC signal is rectified and conditioned within the AC/DC rectification sub-circuit 16. Rectification circuit 16 cooperates with central battery charging sub-circuit 15 which in turn provides charging to central rechargeable battery 14. Battery 14 provides power to soldier power management system 64 which in turn provides power and requests power data 66 as needed to and from the soldier or user carried electronic devices 65, alternatively referred to above as electronic devices 18. Electronic devices 65, 18, power management system 64, and central battery 14, provide power or charge level data to secondary side power and power data processor 72. Secondary side power and power data processor 75 cooperates with battery charging circuit 15, the central rechargeable battery 14, the soldier power management system 64, and with the data modulator circuit 70. The data modulator in turn interfaces to the receiver coil resonant tank circuit 71 changing the characteristic of the tank circuit so as to provide a modulated data signal back to the inductively coupled 7 primary coil 5 and interface circuits in the primary drive 41. The power and power data processor is also responsible for responding to proximity polling requests from the primary drive and then responding by modulating the inductive coupling between the primary and secondary coil 6 by changing the resonant tank circuit conditions of the secondary inductive circuit. Alternately, a trigger device 12 for proximity sensor 9, if employed, may be used as a primary to secondary proximity sensor. Other circuit examples that provide similar capabilities using different circuit constructs can be found within the literature, such as the Wireless Power Consortium specifications.

Figure 11:
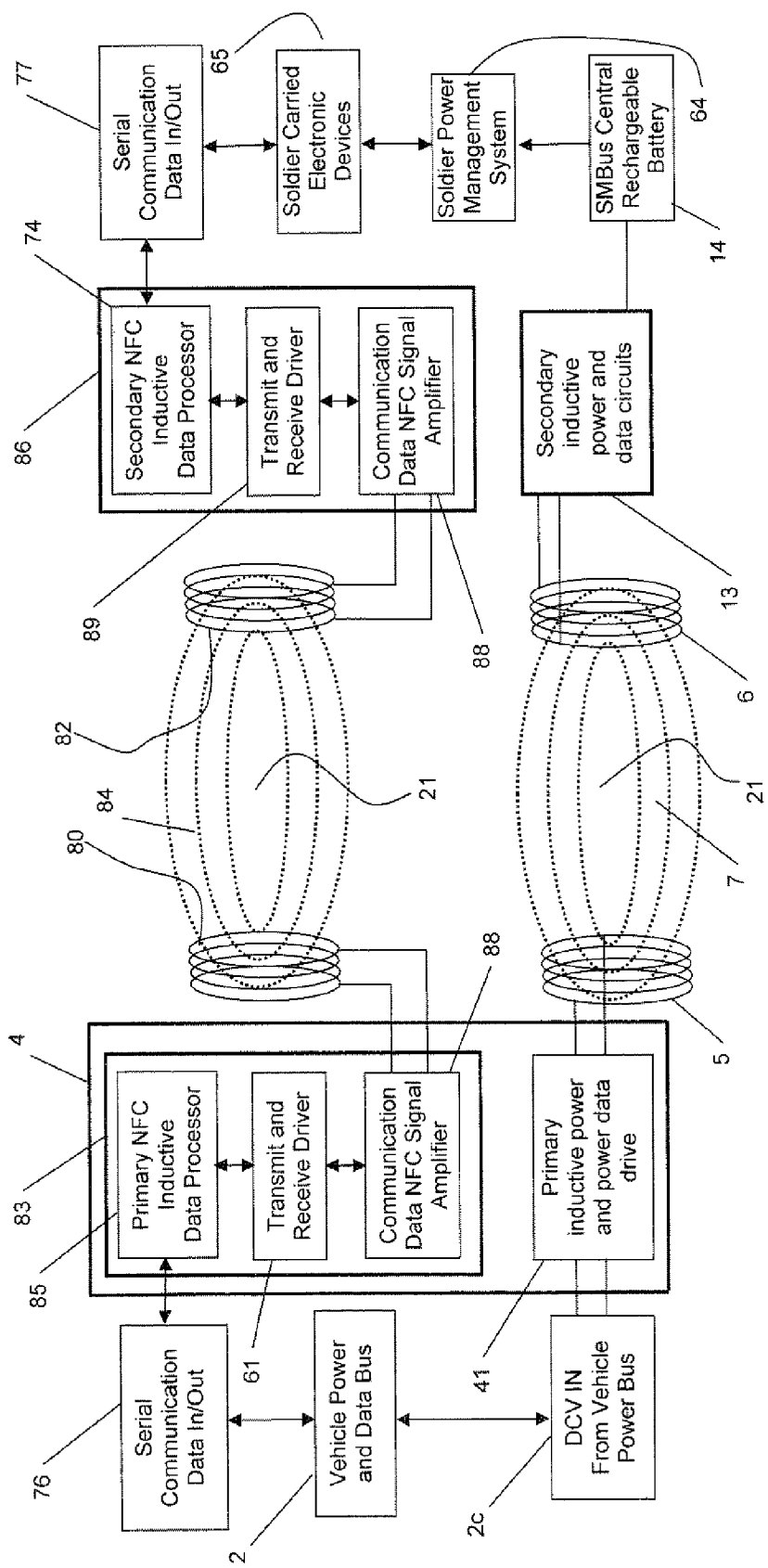
FIG. 11 is a simplified schematic block diagram showing inductive power and inductive communication or Near Field Communication (NFC) data transfer using separate coils and associated drive and processing circuits on each of the primary and secondary sides of the system.

FIG. 11 illustrates a schematic block diagram wherein the inductive transfer of power and inductive communication data is accomplished using separate primary and secondary inductive coil pairs, drive and receive circuits. Although the inductive power transfer coils and inductive data transfer coil are illustrated as being physically separate, that is, non-concentric, it is understood that this is not intended to be limiting in that the power transfer coils and data transfer coils may be of different geometries, physically separate, concentric and adjacent, concentric and embedded, concentric and layered one behind the other or interleaved and adjacent a ferrite backing to name just a few examples.

Thus as seen in FIG. 11, as already described in respect of FIG. 10, inductive power is transferred from primary inductive power coil 5 to secondary inductive power coil 6 across magnetic flux 7. A power source 2a from the vehicle bus 2 provides power to the primary inductive power drive 41 and primary inductive coil 5. On the secondary side of the inductive power transfer, inductive power is received by the secondary inductive power coil 6 and conditioned by the secondary inductive power circuit 13, in turn supplying power to recharge central battery 14, battery 14 providing power for the soldier power management system 64 which in turn powers the soldier carried electronic devices 65 or 18. For the communication data processing and transfer, communication data 76 is transferred from the vehicle power and data bus 2 for example serially, to the inductive power and communication module 4 which contains the primary inductive or NFC data sub-system 86. The principle sub-circuits within the NFC data sub-system 86 are the primary NFC inductive data processor 85, the transmit and receive driver 61, and the communication data NFC signal amplifier 88 which is connected to the NFC primary transmit and receive data antenna 80. Inductive coupling 84 between primary inductive data coil 80 and the secondary inductive data coil 82 across the air gap 21 is accomplished by modulating the magnetic field as described earlier. Data is transmitted and received between the primary and secondary communication circuits according to NFC data transmission protocols in a peer-to-peer, half duplex mode. The communication data transmitted via the modulated magnetic field and received by the secondary data coil 82 received by the signal amplifier 88 and receive circuit 89, then processed by the data processor. Communication data can then be transferred 77 for example serially to soldier carried electronic devices 65. In reverse, soldier devices can communicate data back through the secondary NFC data sub-system 86, but now using the secondary communication data coil 82 as transmit coil or antenna to the primary inductive communication data coil 80 which is now acting as a receiving antenna. When data is received by the primary inductive or NFC data sub-system 83 it can be communicated serially 76 to the vehicle data bus.

Although not illustrated in FIGS. 10 and 11, it is understood that the primary and secondary inductive coil assemblies of FIGS. 10 and 11 may employ the various embodiments exemplified by those depicted in FIGS. 5, 7 and 12-16, wherein the embodiments exemplified by those in FIG. 12 apply to the separate power and data coil pairs of FIG. 11.

FIG. 12 presents a series of partial cutaway sections of construction iterations that show a variety of planar inductive power coil assemblies with integrated co-planar inductive communication data coils. All cutaway sections are presented with the primary coil assembly 5 located on the seat back 3a separated by an air gap 21 from the apparel fabric layer 19 and the secondary coil assembly 6. Also in common with all sections is that the primary coil assemblies have a primary power coil winding 33 and primary communication data coil winding 80, the secondary coil assemblies have a secondary power coil winding 34 and secondary communication data coil winding 82, with both primary and secondary coil assemblies encapsulated in an environmental protective material 31.

FIG. 12a illustrates both primary and secondary coil assemblies with smaller diameter ferrite 78, 79 respectively, backed data coils placed within the inner diameter of the larger ferrite backed inductive power coils. FIG. 12b has the placement of the power and data coils reversed with the data coil and ferrite backing now placed on the outside diameter of the inductive power coils. FIG. 12c illustrates the primary and secondary power and data coils having a common ferrite backing support with the data coil placed on the inside diameter of the power coil, and in FIG. 12d the data coil is placed on the outside diameter of the power coils while still utilising a common ferrite backing. A further arrangement is shown in FIG. 12e where the data coil is positioned in the middle of the power coil diameter on both the primary and secondary coil assemblies. Further iterations of coil arrangements are possible to one skilled in the art.

In addition to circular planar coil configurations, the inductive data or NFC coils may be constructed from any of the multitude of rigid or conformal antenna technologies available including rectangular planar configurations; air backed, ferrite backed, ferrite rod and ferrite core, in geometric shapes that include spherical, cubic and cylindrical and placed into 2D and 3D arrays. Further examples of NFC antennas are provided in FIG. 16.

Figure 13A:
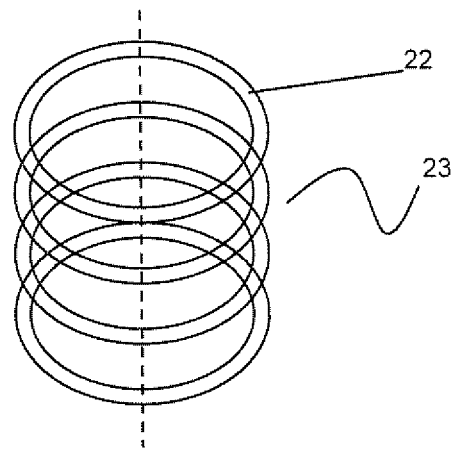
FIG. 13a depicts a one dimensional single vertical column array of elliptical primary inductive power coils.
Figure 13B:
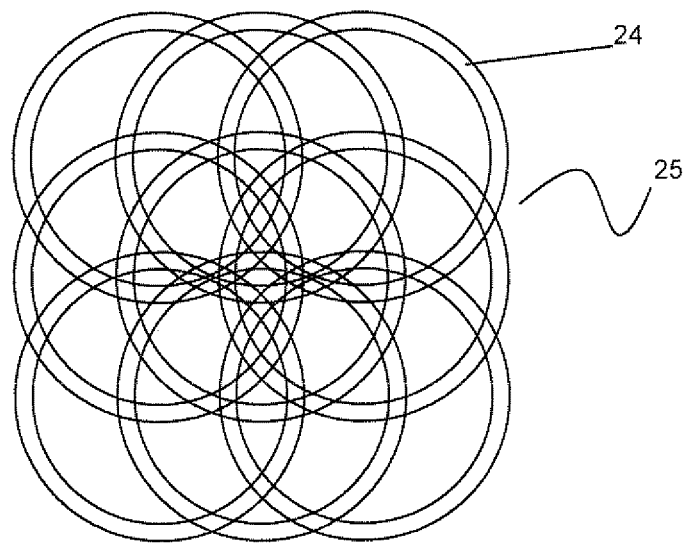
FIG. 13b depicts a multi-column two-dimensional matrix array of individual circular primary inductive power coils.

FIGS. 13a and 13b are further arrangements of the primary power coil assembly on the seat, such as in the seat back, that accommodate a range of user torso heights. FIG. 13a is an illustration of a single column array of primary inductive elliptical coils 23, comprised of multiple overlapping individual elliptical coils 22. Different amount of overlap between the individual coils may be used to suit different design requirements. In FIG. 13b a multi-column matrix array 25 of individual circular coils 24 is presented. Many geometries of coil can be used in array applications. For clarity, ferrite or other magnetic material coil backings that may be used to direct the coils magnetic field are not shown in the figures.

Figure 14:
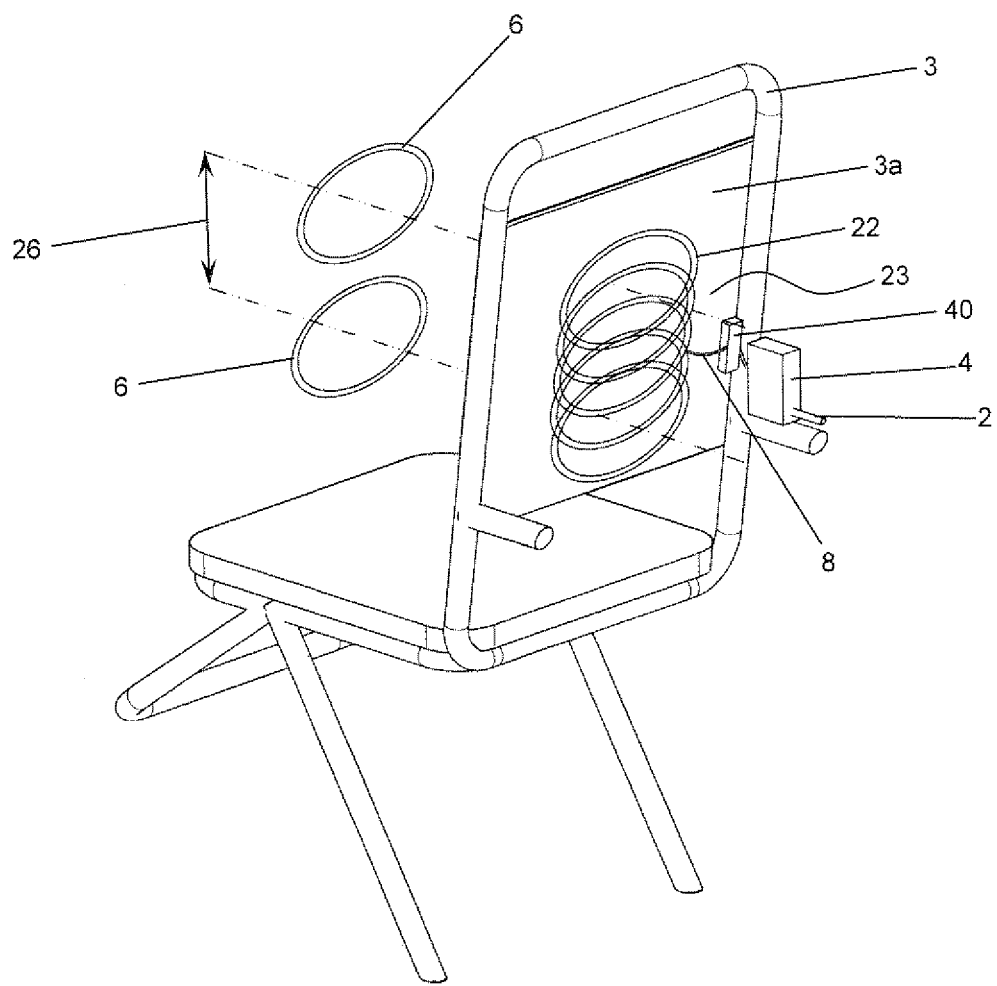
FIG. 14 is in partially exploded rear perspective view, a seat having the array of primary power coils of FIG. 13a mounted in the seat back.

FIG. 14 is a rear perspective view, partially exploded, showing a seat 3 with the implementation of a single column vertical array 23 of individual primary inductive elliptical coils 22 integrated into the seat back 3a. The primary inductive coil array 23 receives AC drive power via a cable 8 from a primary drive circuit 4 via the multiplexer switch 40 located near to the back of the seat. The primary inductive drive 4 receives DC power 2 from the vehicle. The range of heights 26 available for the secondary coil location on a users back, while allowing efficient inductive coupling with the fixed primary coil array 23 is depicted by the two extent locations of the secondary coil assembly 6, shown in projected position away from the seat back 3a. In actual use, a single secondary coil assembly 6 would be located within the back of the outer garment of an occupant and be located proximal to the seat back 3a when the occupant is seated and for inductive power transfer to commence.

Figure 15:
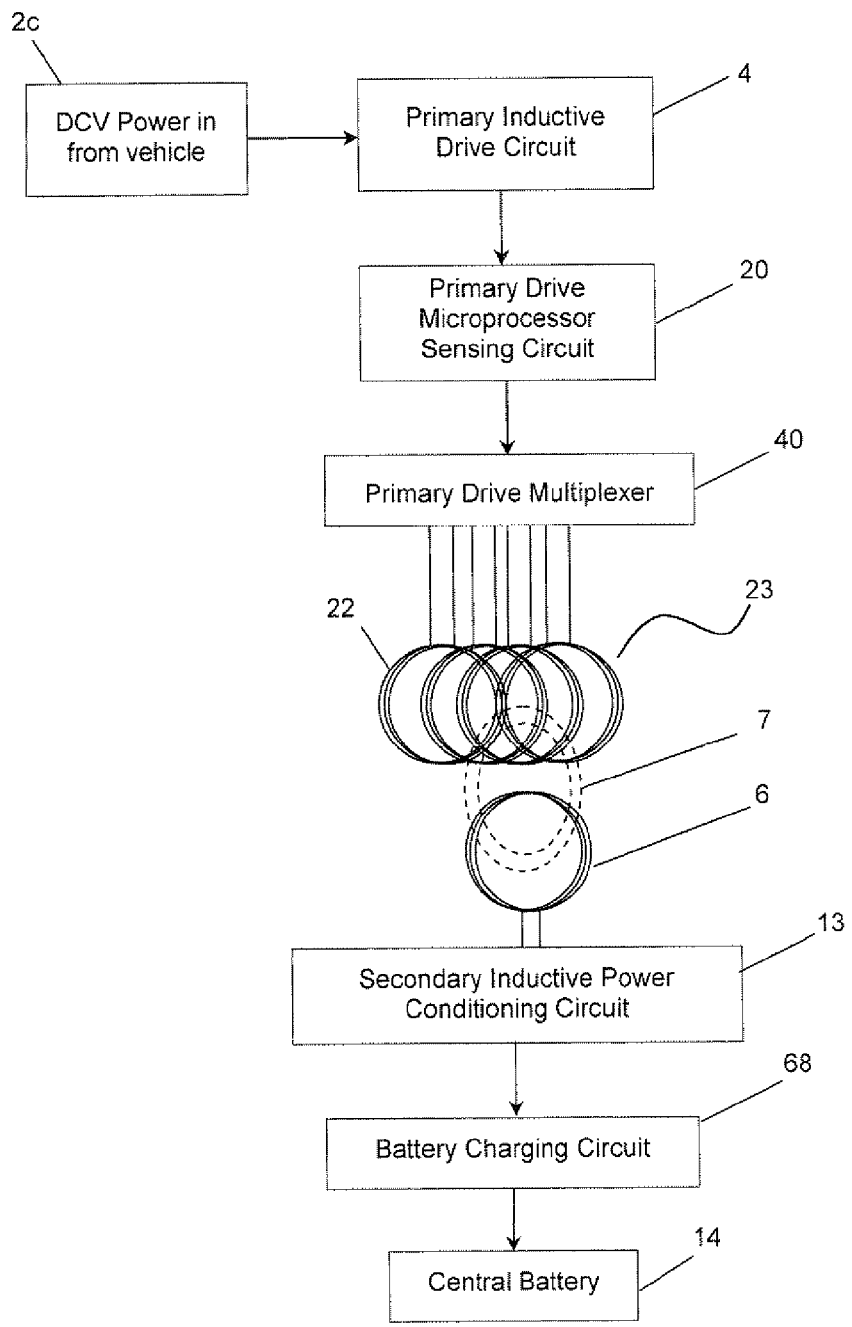
FIG. 15 is a schematic block diagram of wireless inductive power transfer using a multiplexed primary inductive power coil array inductively coupling to an adjacent secondary inductive power coil.

FIG. 15 is a schematic block diagram of wireless inductive power transfer using a multiplexed primary coil array 23 that selects the most suitable primary coil 22 based on resonant circuit characteristics to optimally inductively couple 7 to a co-located secondary coil 6 placed adjacent to the array. DC power from the vehicle 2c is provided to the primary inductive drive circuits 4. The primary drive sensing micro-processor circuit 20 monitors the resonant tank circuit characteristics of each primary coil 22 of the primary coil array 23 as each of the primary coils 22 are energized through the multiplexer switch 40. When the correct tank circuit resonant characteristic such as impedance, frequency, or current draw created by the mutual inductance of co-located primary and secondary inductive coils meets defined criteria, the sensing circuit 20 maintains the flow of energy to that individual primary coil 22 within the array 23. The magnetic flux 7 generated by the AC power flowing through the primary drive tank circuits energized primary coil 22, couples inductively with the secondary coil 6 located on the user. The inductive power received by the secondary coil 6 is rectified, conditioned and then provided to an electrical load such as the charging circuit 68 to charge the occupants central battery 14. Alternately, each primary inductive power coil in the array may have its own discrete drive circuit that are turned on sequentially by the array multiplexer circuit, with the most appropriate drive circuit to remain powered on determined by the primary drive sensing micro-processor and the optimal mutual inductance circuit characteristics produced when a primary and secondary coils are in proximity.

FIG. 16a through 16e shows examples of antennas that could be used for inductive data transmission and reception. The primary example in FIG. 16a is an inductive receiving or transmitting inductive coil assembly 100 comprised of a ferrite rod 101 over which an inductive data coil 102 is positioned. FIG. 16b is an illustration of a transmitting inductive data coil 105a producing an alternating and modulated magnetic field 103 that generally has the shape of a torus with decreasing magnetic field flux lines 104 as the distance from the antenna increases. A secondary receiving or transmitting inductive data coil assembly 105b is located within the magnetic field of influence of the primary data coil 105a and the two inductive data coils are able to communicate. FIG. 16c is a diagram of a two axis (X and Y) 2D inductive data coil assembly 106, with the antennas positioned at approximately right angles to each other. As a transmitting or receiving system this 2D coil configuration has an improved capability to inductively couple with a secondary single data coil assembly 100 when alignment between the transmit and receive coils would be less than optimal if coupling was only between single coil assemblies. FIG. 16d shows a three axis (X,Y,Z) assembly 107 comprised of three single inductive coil 100 to produce a 3D inductive data antenna that allows inductive data coupling in all three X, Y, and Z orthogonal planes. FIG. 16e is a representation of an single axis inductive data coil 112, printed on a printed circuit board 110 with circuit traces 111 as coil windings. The PCB material may be rigid or flexible carrier material using a rectangular, circular or other geometries of winding. Other coil configuration for single axis, 2D and 3D axis are known to those skilled in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for providing a user, while occupying a support structure cooperating with a vehicle, with at least electrical power wirelessly without the use of a conductive electrical connection between the user and the support structure or vehicle, the system comprising:
an inductive power transfer sub-system including:
a) a support structure having a power transmitting primary conductive coil assembly comprising at least one primary transmitting coil, said support structure adapted to be mounted in cooperation with a vehicle,
b) at least one primary drive circuit, cooperating with said power transmitting primary conductive coil assembly,
c) apparel having therein a power receiving secondary conductive coil assembly, comprising a secondary receiving coil and a secondary power conditioning circuit, said apparel adapted to be worn by a user,
wherein said primary and secondary conductive coil assemblies transmit and receive electrical power when the user, while wearing said apparel, is occupying said support structure so as to mutually inductively connect said power transmitting primary conductive coil assembly and said power receiving secondary conductive coil assembly to each other across an air gap therebetween using an alternating magnetic field,
at least one power sink assembly adapted for wearing by the user, said at least one power sink assembly including at least one power sink and adapted for charging of said at least one power sink by said secondary power conditioning circuit upon said inductive connection between said power transmitting primary conductive coil assembly and said power receiving secondary conductive coil assembly.

2. The system of claim 1 wherein said at least one primary drive circuit includes at least one resonant drive circuit and wherein said power transmitting primary conductive coil assembly and said power receiving secondary conductive coil assembly, and said at least one resonant drive circuit have different resonant frequencies.

3. The system of claim 1 wherein said at least one primary drive circuit includes at least one resonant drive circuit and wherein said at least one resonant drive circuit and said secondary power conditioning circuit have substantially the same resonant frequencies to enhance power transfer efficiency.

4. The system of claim 1 wherein said power transmitting primary conductive coil assembly includes an array of primary transmitting coils of said at least one primary transmitting coil.

5. The system of claim 1 wherein said power transmitting primary conductive coil assembly is an inductive element of a resonant LC tank circuit driven by an alternating current of a primary inductive power drive circuit of said at least one primary drive circuit.

6. The system of claim 4 wherein said at least one primary drive circuit is adapted for mounting in the vehicle and cooperates with said power transmitting primary conductive coil assembly, wherein said primary drive circuit is an alternating current drive circuit adapted to energize at least one inductive coil of said power transmitting primary conductive coil assembly so as to generate said alternating magnetic field to transfer electric power, and wherein said alternating magnetic field is modulated for communication thereby transferring power and communicating power data between said primary transmitting coil and said secondary receiving coil via magnetic flux coupling by said mutually inductive connection between said at least one primary transmitting coil of said power transmitting primary conductive coil assembly and said power receiving second conductive coil assembly.

7. The system of claim 6 wherein said at least one primary drive circuit is adapted for mounting in the vehicle and cooperates with said power transmitting primary conductive coil assembly, wherein said primary drive circuit is an alternating current drive circuit adapted to energize at least one inductive coil of said power transmitting primary conductive coil assembly so as to generate said alternating magnetic field to transfer electric power, and wherein said alternating magnetic field is modulated for communication thereby transferring power and communicating power data between said primary transmitting coil and said secondary receiving coil via magnetic flux coupling by said mutually inductive connection between said at least one primary transmitting coil of said power transmitting primary conductive coil assembly and said power receiving second conductive coil assembly.

8. The system of claim 1 wherein said secondary power conditioning circuit communicates with said primary drive circuit by modulating inductively coupled power signals from said power transmitting primary conductive coil assembly by changing resonant characteristics of said secondary power conditioning circuit.

9. The system of claim 1 further comprising a data communication sub-system for data communication which includes communication data primary and secondary inductive coil assemblies having corresponding communication data primary and secondary inductive coils, and associated communication data drive and signal processing circuits for inductively connected data communication to transmit and receive data from the group of data comprising voice, text, numerical, location, tactical, images, video.

10. The system of claim 9 wherein either said communication data primary or secondary inductive coils and said associated communication data drive and signal processing circuits provide for data transmitting and receiving by either a peer-to-peer mode or dedicated transmitter-receiver mode.

11. The system of claim 9 wherein said associated communication data drive and signal processing circuits are adapted to provide said data communication using near field communication so that the user in said support structure pairs and said connects to said communication data primary inductive coil assembly automatically and substantially as soon as the user is occupying said support structure, and is adapted to maintain said inductively connected data communication after said connection is established.

12. The system of claim 9 wherein said data communication sub-system and said inductive power transfer sub-system are independent sub-systems.

13. The system of claim 9 wherein said data communication sub-system and said inductive power transfer sub-system are an integrated system.

14. The system of claim 9 wherein said communication data primary and secondary inductive coils are respectively on the same axes as, and respectively integrated into, said primary transmitting coil and said secondary receiving coil.

15. The system of claim 9 wherein said communication data primary and secondary inductive coils are respectively in a separate location from said primary transmitting coil and said secondary receiving coil.

16. The system of claim 10 wherein said communication data primary and secondary inductive coil assemblies employ antenna or coil assemblies having configurations chosen from the group comprising: two-dimensional, three-dimensional.

17. The system of claim 1 wherein said support structure includes a seat and wherein said apparel is torso-covering apparel, and wherein said primary inductive power coil assembly is on a seat back of said seat, and said secondary inductive coil assembly is located on a back portion of said torso-covering apparel.

18. The system of claim 4 wherein said support structure includes a seat and wherein said apparel is torso-covering apparel, and wherein said primary inductive power coil assembly is on a seat back of said seat, and said secondary inductive coil assembly is located on a back portion of said torso-covering apparel.

19. The system of claim 4 wherein said at least one primary drive circuit is adapted to detect and correlate a coil of said primary transmitting coils in said array which when energized is most efficiently coupled to said secondary receiving coil, and to energize said most efficiently coupled coil.

20. The system of claim 4 wherein said apparel includes apparel adapted for wearing on any one or combination of locations on a body of a user, wherein said locations are chosen from the group including: torso, back, buttocks, legs, feet, arms, neck, shoulder, crotch, wrist, pelvis, hand, head.

21. The system of claim 11 wherein a range limit of said near field communication for said data communication is substantially one meter.

22. The system of claim 1 wherein said air gap of said inductive power connection is in the power range connection range of substantially 0-5 centimeters.

23. The system of claim 22 wherein said power connection range is substantially 0-10 centimeters.

24. The system of claim 23 wherein said power connection range is substantially 0-20 centimeters.

25. The system of claim 22 wherein said primary transmitting coil and secondary receiving coils and wherein said at least one primary drive circuit and said secondary power conditioning circuit are adapted to: (a) continuously continue said transfer of said power between said primary transmitting coil and said secondary receiving coil until said power connection range limit is exceeded and said inductive connection thereby terminated, and, (b) automatically re-establish said inductive connection between said primary transmitting coil array and said secondary receiving coil upon detection of said primary transmitting coil and said secondary receiving coil within said power connection range of each other.

26. The system of claim 11 wherein a primary data processor in said data communication sub-system is adapted to: (a) continuously continue said transfer of said communication data between said communication data primary and secondary coils of said communication data primary and secondary inductive coil assemblies until said range limit of said near field communication is exceeded and said near field communication thereby terminated, and, (b) automatically re-establish said inductive connection between said primary and secondary communication data coils upon detection of said communication data primary and secondary coils within said range limit of said near field communication of each other.

27. The system of claim 4 wherein said support structure includes a seat having a seat back and wherein said seat back maybe rigid or flexible and wherein said primary inductive coil array is at least in part correspondingly rigid or flexible.

28. The system of claim 27 wherein said array includes coils having a ferrite backing and said ferrite backing is segmented so as to be flexible.

29. The system of claim 1 wherein at least one of said primary transmitting coil and said secondary receiving coil has a ferrite backing and said ferrite backing is segmented to provide flexibility.

30. The system of claim 27 wherein said secondary receiving coil is flexible so as to provide substantially parallel alignment of said primary transmitting coils in said array and said secondary receiving coil when said user is sitting in said seat with said back portion of said apparel against said seat back.

31. A system for providing a user, while occupying a support structure cooperating with a vehicle, with at least electrical power wirelessly without the use of a conductive electrical connection between the user and the support structure or vehicle, the system comprising:

a data communication sub-system for data communication which includes communication data primary and secondary inductive coil assemblies having corresponding communication data primary and secondary inductive coils, and corresponding primary and secondary communication data drive and signal processing circuits for inductively connected data communication between said communication data primary and secondary inductive coils to transmit and receive data therebetween from the group of data comprising voice, text, numerical, location, tactical, images, video, said communication data primary inductive coil assembly mounted in cooperation with a support structure, said support structure adapted to be mounted in cooperation with a vehicle, said communication data secondary inductive coil assembly mounted in apparel having therein said secondary communication data drive and signal processing circuit, said apparel adapted to be worn by a user.

32. The system of claim 31 further comprising:
an inductive power transfer sub-system including:
a) a power transmitting primary conductive coil assembly comprising at least one primary transmitting coil, and cooperating with said support structure,
b) at least one primary drive circuit, cooperating with said power transmitting primary conductive coil assembly,
c) a power receiving secondary conductive coil assembly, comprising a secondary receiving coil and a secondary power conditioning circuit, and mounted in said apparel,
wherein said primary and secondary conductive coil assemblies transmit and receive electrical power when the user, while wearing said apparel, is occupying said support structure so as to mutually inductively connect said power transmitting primary conductive coil assembly and said power receiving secondary conductive coil assembly to each other across an air gap therebetween using an alternating magnetic field,
at least one power sink assembly adapted for wearing by the user, said at least one power sink assembly including at least one power sink and adapted for charging of said at least one power sink by said secondary power conditioning circuit upon said inductive connection between said power transmitting primary conductive coil assembly and said power receiving secondary conductive coil assembly.

33. The system of claim 32 wherein said at least one primary drive circuit includes at least one resonant drive circuit and wherein said power transmitting primary conductive coil assembly and said power receiving secondary conductive coil assembly, and said at least one resonant drive circuit have different resonant frequencies.

34. The system of claim 32 wherein said at least one primary drive circuit includes at least one resonant drive circuit and wherein said at least one resonant drive circuit and said secondary power conditioning circuit have substantially the same resonant frequencies to enhance power transfer efficiency.

35. The system of claim 32 wherein said power transmitting primary conductive coil assembly includes an array of primary transmitting coils of said at least one primary transmitting coil.

36. The system of claim 32 wherein said power transmitting primary conductive coil assembly is an inductive element of a resonant LC tank circuit driven by an alternating current of a primary inductive power drive circuit of said at least one primary drive circuit.

37. The system of claim 35 wherein said at least one primary drive circuit is adapted for mounting in the vehicle and cooperates with said power transmitting primary conductive coil assembly, wherein said primary drive circuit is an alternating current drive circuit adapted to energize at least one inductive coil of said power transmitting primary conductive coil assembly so as to generate said alternating magnetic field to transfer electric power, and wherein said alternating magnetic field is modulated for communication thereby transferring power and communicating power data between said primary transmitting coil and said secondary receiving coil via magnetic flux coupling by said mutually inductive connection between said at least one primary transmitting coil of said power transmitting primary conductive coil assembly and said power receiving second conductive coil assembly.

38. The system of claim 37 wherein said at least one primary drive circuit is adapted for mounting in the vehicle and cooperates with said power transmitting primary conductive coil assembly, wherein said primary drive circuit is an alternating current drive circuit adapted to energize at least one inductive coil of said power transmitting primary conductive coil assembly so as to generate said alternating magnetic field to transfer electric power, and wherein said alternating magnetic field is modulated for communication thereby transferring power and communicating power data between said primary transmitting coil and said secondary receiving coil via magnetic flux coupling by said mutually inductive connection between said at least one primary transmitting coil of said power transmitting primary conductive coil assembly and said power receiving second conductive coil assembly.

39. The system of claim 32 wherein said secondary power conditioning circuit communicates with said primary drive circuit by modulating inductively coupled power signals from said power transmitting primary conductive coil assembly by changing resonant characteristics of said secondary power conditioning circuit.

40. The system of claim 31 wherein either said communication data primary or secondary inductive coils and said associated communication data drive and signal processing circuits provide for data transmitting and receiving by either a peer-to-peer mode or dedicated transmitter-receiver mode.

41. The system of claim 31 wherein said associated communication data drive and signal processing circuits are adapted to provide said data communication using near field communication so that the user in said support structure pairs and said connects to said communication data primary inductive coil assembly automatically and substantially as soon as the user is occupying said support structure, and is adapted to maintain said inductively connected data communication after said connection is established.

42. The system of claim 31 wherein said data communication sub-system and said inductive power transfer sub-system are independent sub-systems.

43. The system of claim 31 wherein said data communication sub-system and said inductive power transfer sub-system are an integrated system.

44. The system of claim 31 wherein said communication data primary and secondary inductive coils are respectively on the same axes as, and respectively integrated into, said primary transmitting coil and said secondary receiving coil.

45. The system of claim 31 wherein said communication data primary and secondary inductive coils are respectively in a separate location from said primary transmitting coil and said secondary receiving coil.

46. The system of claim 40 wherein said communication data primary and secondary inductive coil assemblies employ antenna or coil assemblies having configurations chosen from the group comprising: two-dimensional, three-dimensional.

47. The system of claim 32 wherein said support structure includes a seat and wherein said apparel is torso-covering apparel, and wherein said primary inductive power coil assembly is on a seat back of said seat, and said secondary inductive coil assembly is located on a back portion of said torso-covering apparel.

48. The system of claim 31 wherein said communication data primary inductive coil includes an array of communication data primary inductive coils.

49. The system of claim 48 wherein said support structure includes a seat and wherein said apparel is torso-covering apparel, and wherein said communication data primary inductive coil assembly is on a seat back of said seat, and said communication data secondary inductive coil assembly is located on a back portion of said torso-covering apparel.

50. The system of claim 48 wherein said primary communication data drive and signal processing circuit is adapted to detect and correlate a coil of said communication data primary inductive coils in said array of communication data primary inductive coils which when energized is most efficiently coupled to said communication data secondary inductive coil, and to energize said most efficiently coupled communication data primary inductive coil.

51. The system of claim 31 wherein said apparel includes apparel adapted for wearing on any one or combination of locations on a body of a user, wherein said locations are chosen from the group including: torso, back, buttocks, legs, feet, arms, neck, shoulder, crotch, wrist, pelvis, hand, head.

52. The system of claim 41 wherein a range limit of said near field communication for said data communication is substantially one meter.

53. The system of claim 32 wherein said air gap of said inductive power connection is in the power range connection range of substantially 0-5 centimeters.

54. The system of claim 53 wherein said power connection range is substantially 0-10 centimeters.

55. The system of claim 54 wherein said power connection range is substantially 0-20 centimeters.

56. The system of claim 53 wherein said primary transmitting coil and secondary receiving coils and wherein said at least one primary drive circuit and said secondary power conditioning circuit are adapted to: (a) continuously continue said transfer of said power between said primary transmitting coil and said secondary receiving coil until said power connection range limit is exceeded and said inductive connection thereby terminated, and, (b) automatically re-establish said inductive connection between said primary transmitting coil array and said secondary receiving coil upon detection of said primary transmitting coil and said secondary receiving coil within said power connection range of each other.

57. The system of claim 41 wherein a primary data processor in said data communication sub-system is adapted to: (a) continuously continue said transfer of said communication data between said communication data primary and secondary coils of said communication data primary and secondary inductive coil assemblies until said range limit of said near field communication is exceeded and said near field communication thereby terminated, and, (b) automatically re-establish said inductive connection between said primary and secondary communication data coils upon detection of said communication data primary and secondary coils within said range limit of said near field communication of each other.

58. The system of claim 35 wherein said support structure includes a seat having a seat back and wherein said seat back maybe rigid or flexible and wherein said primary inductive coil array is at least in part correspondingly rigid or flexible.

59. The system of claim 58 wherein said array includes coils having a ferrite backing and said ferrite backing is segmented so as to be flexible.

60. The system of claim 32 wherein at least one of said primary transmitting coil and said secondary receiving coil has a ferrite backing and said ferrite backing is segmented to provide flexibility.

61. The system of claim 58 wherein said secondary receiving coil is flexible so as to provide substantially parallel alignment of said primary transmitting coils in said array and said secondary receiving coil when said user is sitting in said seat with said back portion of said apparel against said seat back.

62. A method for providing a user, while occupying a support structure cooperating with a vehicle, with at least electrical power wirelessly without the use of a conductive electrical connection between the user and the support structure or vehicle, the method comprising:
   a) providing an inductive power transfer sub-system including:
      a) a support structure having a power transmitting primary conductive coil assembly comprising at least one primary transmitting coil, said support structure adapted to be mounted in cooperation with a vehicle,
      b) at least one primary drive circuit, cooperating with said power transmitting primary conductive coil assembly,
      c) apparel having therein a power receiving secondary conductive coil assembly, comprising a secondary receiving coil and a secondary power conditioning circuit, said apparel adapted to be worn by a user,
   wherein said primary and secondary conductive coil assemblies transmit and receive electrical power when the user, while wearing said apparel, is occupying said support structure so as to mutually inductively connect said power transmitting primary conductive coil assembly and said power receiving secondary conductive coil assembly to each other across an air gap therebetween using an alternating magnetic field, and,
   b) providing at least one power sink assembly adapted for wearing by the user, said at least one power sink assembly including at least one power sink and adapted for charging of said at least one power sink by said secondary power conditioning circuit upon said inductive connection between said power transmitting primary conductive coil assembly and said power receiving secondary conductive coil assembly.

63. The method of claim 62 wherein said at least one primary drive circuit includes at least one resonant drive circuit and wherein said power transmitting primary conductive coil assembly and said power receiving secondary conductive coil assembly, and said at least one resonant drive circuit have different resonant frequencies.

64. The method of claim 62 wherein said at least one primary drive circuit includes at least one resonant drive circuit and wherein said at least one resonant drive circuit and said secondary power conditioning circuit have substantially the same resonant frequencies to enhance power transfer efficiency.

65. The method of claim 62 wherein said power transmitting primary conductive coil assembly includes an array of primary transmitting coils of said at least one primary transmitting coil.

66. The method of claim 62 wherein said power transmitting primary conductive coil assembly is an inductive element of a resonant LC tank circuit driven by an alternating current of a primary inductive power drive circuit of said at least one primary drive circuit.

67. The method of claim 65 wherein said at least one primary drive circuit is adapted for mounting in the vehicle and cooperates with said power transmitting primary conductive coil assembly, wherein said primary drive circuit is an alternating current drive circuit adapted to energize at least one inductive coil of said power transmitting primary conductive coil assembly so as to generate said alternating magnetic field to transfer electric power, and wherein said alternating magnetic field is modulated for communication thereby transferring power and communicating power data between said primary transmitting coil and said secondary receiving coil via magnetic flux coupling by said mutually inductive connection between said at least one primary transmitting coil of said power transmitting primary conductive coil assembly and said power receiving second conductive coil assembly.

68. The method of claim 67 wherein said at least one primary drive circuit is adapted for mounting in the vehicle and cooperates with said power transmitting primary conductive coil assembly, wherein said primary drive circuit is an alternating current drive circuit adapted to energize at least one inductive coil of said power transmitting primary conductive coil assembly so as to generate said alternating magnetic field to transfer electric power, and wherein said alternating magnetic field is modulated for communication thereby transferring power and communicating power data between said primary transmitting coil and said secondary receiving coil via magnetic flux coupling by said mutually inductive connection between said at least one primary transmitting coil of said power transmitting primary conductive coil assembly and said power receiving second conductive coil assembly.

69. The method of claim 62 wherein said secondary power conditioning circuit communicates with said primary drive circuit by modulating inductively coupled power signals from said power transmitting primary conductive coil assembly by changing resonant characteristics of said secondary power conditioning circuit.

70. The method of claim 62 further comprising providing a data communication sub-system for data communication which includes communication data primary and secondary inductive coil assemblies having corresponding communication data primary and secondary inductive coils, and associated communication data drive and signal processing circuits for inductively connected data communication to transmit and receive data from the group of data comprising voice, text, numerical, location, tactical, images, video.

71. The method of claim 70 wherein either said communication data primary or secondary inductive coils and said associated communication data drive and signal processing circuits provide for data transmitting and receiving by either a peer-to-peer mode or dedicated transmitter-receiver mode.

72. The method of claim 70 wherein said associated communication data drive and signal processing circuits are adapted to provide said data communication using near field communication so that the user in said support structure pairs and said connects to said communication data primary inductive coil assembly automatically and substantially as soon as the user is occupying said support structure, and is adapted to maintain said inductively connected data communication after said connection is established.

73. The method of claim 70 wherein said data communication sub-system and said inductive power transfer sub-system are independent sub-systems.

74. The method of claim 70 wherein said data communication sub-system and said inductive power transfer sub-system are an integrated method.

75. The method of claim 70 wherein said communication data primary and secondary inductive coils are respectively on the same axes as, and respectively integrated into, said primary transmitting coil and said secondary receiving coil.

76. The method of claim 70 wherein said communication data primary and secondary inductive coils are respectively in a separate location from said primary transmitting coil and said secondary receiving coil.

77. The method of claim 71 wherein said communication data primary and secondary inductive coil assemblies employ antenna or coil assemblies having configurations chosen from the group comprising: two-dimensional, three-dimensional.

78. The method of claim 62 wherein said support structure includes a seat and wherein said apparel is torso-covering apparel, and wherein said primary inductive power coil assembly is on a seat back of said seat, and said secondary inductive coil assembly is located on a back portion of said torso-covering apparel.

79. The method of claim 65 wherein said support structure includes a seat and wherein said apparel is torso-covering apparel, and wherein said primary inductive power coil assembly is on a seat back of said seat, and said secondary inductive coil assembly is located on a back portion of said torso-covering apparel.

80. The method of claim 65 wherein said at least one primary drive circuit is adapted to detect and correlate a coil of said primary transmitting coils in said array which when energized is most efficiently coupled to said secondary receiving coil, and to energize said most efficiently coupled coil.

81. The method of claim 65 wherein said apparel includes apparel adapted for wearing on any one or combination of locations on a body of a user, wherein said locations are chosen from the group including: torso, back, buttocks, legs, feet, arms, neck, shoulder, crotch, wrist, pelvis, hand, head.

82. The method of claim 72 wherein a range limit of said near field communication for said data communication is substantially one meter.

83. The method of claim 62 wherein said air gap of said inductive power connection is in the power range connection range of substantially 0-5 centimeters.

84. The method of claim 83 wherein said power connection range is substantially 0-10 centimeters.

85. The method of claim 84 wherein said power connection range is substantially 0-20 centimeters.

86. The method of claim 83 wherein said primary transmitting coil and secondary receiving coils and wherein said at least one primary drive circuit and said secondary power conditioning circuit are adapted to: (a) continuously continue said transfer of said power between said primary transmitting coil and said secondary receiving coil until said power connection range limit is exceeded and said inductive connection thereby terminated, and, (b) automatically re-establish said inductive connection between said primary transmitting coil array and said secondary receiving coil upon detection of said primary transmitting coil and said secondary receiving coil within said power connection range of each other.

87. The method of claim 72 wherein a primary data processor in said data communication sub-system: (a) continuously continues said transfer of said communication data between said communication data primary and secondary coils of said communication data primary and secondary inductive coil assemblies until said range limit of said near field communication is exceeded and said near field communication thereby terminated, and, (b) automatically re-establishes said inductive connection between said primary and secondary communication data coils upon detection of said communication data primary and secondary coils within said range limit of said near field communication of each other.

88. The method of claim 65 wherein said support structure includes a seat having a seat back and wherein said seat back maybe rigid or flexible and wherein said primary inductive coil array is at least in part correspondingly rigid or flexible.

89. The method of claim 88 wherein said array includes coils having a ferrite backing and said ferrite backing is segmented so as to be flexible.

90. The method of claim 62 wherein at least one of said primary transmitting coil and said secondary receiving coil has a ferrite backing and said ferrite backing is segmented to provide flexibility.

91. The method of claim 88 wherein said secondary receiving coil is flexible so as to provide substantially parallel alignment of said primary transmitting coils in said array and said secondary receiving coil when said user is sitting in said seat with said back portion of said apparel against said seat back.

92. A method for providing a user, while occupying a support structure cooperating with a vehicle, with at least electrical power wirelessly without the use of a conductive electrical connection between the user and the support structure or vehicle, the method comprising:
  a) providing a data communication sub-system for data communication which includes communication data primary and secondary inductive coil assemblies having corresponding communication data primary and secondary inductive coils, and corresponding primary and secondary communication data drive and signal processing circuits for inductively connected data communication between said communication data primary and secondary inductive coils to transmit and receive data therebetween from the group of data comprising voice, text, numerical, location, tactical, images, video,
  said communication data primary inductive coil assembly mounted in cooperation with a support structure, said support structure adapted to be mounted in cooperation with a vehicle,
  b) providing apparel having said communication data secondary inductive coil assembly and said secondary communication data drive and signal processing circuit mounted therein, said apparel adapted to be worn by a user.

93. The method of claim 92 further comprising:
  a) providing an inductive power transfer sub-system including:
    a) a power transmitting primary conductive coil assembly comprising at least one primary transmitting coil, and cooperating with said support structure,
    b) at least one primary drive circuit, cooperating with said power transmitting primary conductive coil assembly,
    c) a power receiving secondary conductive coil assembly, comprising a secondary receiving coil and a secondary power conditioning circuit, and mounted in said apparel.
  wherein said primary and secondary conductive coil assemblies transmit and receive electrical power when the user, while wearing said apparel, is occupying said support structure so as to mutually inductively connect said power transmitting primary conductive coil, assembly and said power receiving secondary conductive coil assembly to each other across an air gap therebetween using an alternating magnetic field,
  b) at least one power sink assembly adapted for wearing by the user, said at least one power sink assembly including at least one power sink and adapted for charging of said at least one power sink by said secondary power conditioning circuit upon said inductive connection between said power transmitting primary conductive coil assembly and said power receiving secondary conductive coil assembly.

94. The method of claim 93 wherein said at least one primary drive circuit includes at least one resonant drive circuit and wherein said power transmitting primary conductive coil assembly and said power receiving secondary conductive coil assembly, and said at least one resonant drive circuit have different resonant frequencies.

95. The method of claim 93 wherein said at least one primary drive circuit includes at least one resonant drive circuit and wherein said at least one resonant drive circuit and said secondary power conditioning circuit have substantially the same resonant frequencies to enhance power transfer efficiency.

96. The method of claim 93 wherein said power transmitting primary conductive coil assembly includes an array of primary transmitting coils of said at least one primary transmitting coil.

97. The method of claim 93 wherein said power transmitting primary conductive coil assembly is an inductive element of a resonant LC tank circuit driven by an alternating current of a primary inductive power drive circuit of said at least one primary drive circuit.

98. The method of claim 96 wherein said at least one primary drive circuit is adapted for mounting in the vehicle and cooperates with said power transmitting primary conductive coil assembly, wherein said primary drive circuit is an alternating current drive circuit adapted to energize at least one inductive coil of said power transmitting primary conductive coil assembly so as to generate said alternating magnetic field to transfer electric power, and wherein said alternating magnetic field is modulated for communication thereby transferring power and communicating power data between said primary transmitting coil and said secondary receiving coil via magnetic flux coupling by said mutually inductive connection between said at least one primary transmitting coil of said power transmitting primary conductive coil assembly and said power receiving second conductive coil assembly.

99. The method of claim 98 wherein said at least one primary drive circuit is adapted for mounting in the vehicle and cooperates with said power transmitting primary conductive coil assembly, wherein said primary drive circuit is an alternating current drive circuit adapted to energize at least one inductive coil of said power transmitting primary conductive coil assembly so as to generate said alternating magnetic field to transfer electric power, and wherein said alternating magnetic field is modulated for communication thereby transferring power and communicating power data between said primary transmitting coil and said secondary receiving coil via magnetic flux coupling by said mutually inductive connection between said at least one primary transmitting coil of said power transmitting primary conductive coil assembly and said power receiving second conductive coil assembly.

100. The method of claim 93 wherein said secondary power conditioning circuit communicates with said primary drive circuit by modulating inductively coupled power signals from said power transmitting primary conductive coil assembly by changing resonant characteristics of said secondary power conditioning circuit.

101. The method of claim 92 wherein either said communication data primary or secondary inductive coils and said associated communication data drive and signal processing circuits provide for data transmitting and receiving by either a peer-to-peer mode or dedicated transmitter-receiver mode.

102. The method of claim 92 wherein said associated communication data drive and signal processing circuits are adapted to provide said data communication using near field communication so that the user in said support structure pairs and said connects to said communication data primary inductive coil assembly automatically and substantially as soon as the user is occupying said support structure, and is adapted to maintain said inductively connected data communication after said connection is established.

103. The method of claim 92 wherein said data communication sub-system and said inductive power transfer sub-system are independent sub-systems.

104. The method of claim 92 wherein said data communication sub-system and said inductive power transfer sub-system are an integrated method.

105. The method of claim 92 wherein said communication data primary and secondary inductive coils are respectively on the same axes as, and respectively integrated into, said primary transmitting coil and said secondary receiving coil.

106. The method of claim 92 wherein said communication data primary and secondary inductive coils are respectively in a separate location from said primary transmitting coil and said secondary receiving coil.

107. The method of claim 101 wherein said communication data primary and secondary inductive coil assemblies employ antenna or coil assemblies having configurations chosen from the group comprising: two-dimensional, three-dimensional.

108. The method of claim 93 wherein said support structure includes a seat and wherein said apparel is torso-covering apparel, and wherein said primary inductive power coil assembly is on a seat back of said seat, and said secondary inductive coil assembly is located on a back portion of said torso-covering apparel.

109. The method of claim 92 wherein said communication data primary inductive coil includes an array of communication data primary inductive coils.

110. The method of claim 109 wherein said support structure includes a seat and wherein said apparel is torso-covering apparel, and wherein said communication data primary inductive coil assembly is on a seat back of said seat, and said communication data secondary inductive coil assembly is located on a back portion of said torso-covering apparel.

111. The method of claim 109 wherein said primary communication data drive and signal processing circuit is adapted to detect and correlate a coil of said communication data primary inductive coils in said array of communication data primary inductive coils which when energized is most efficiently coupled to said communication data secondary inductive coil, and to energize said most efficiently coupled communication data primary inductive coil.

112. The method of claim 92 wherein said apparel includes apparel adapted for wearing on any one or combination of locations on a body of a user, wherein said locations are chosen from the group including: torso, back, buttocks, legs, feet, arms, neck, shoulder, crotch, wrist, pelvis, hand, head.

113. The method of claim 102 wherein a range limit of said near field communication for said data communication is substantially one meter.

114. The method of claim 93 wherein said air gap of said inductive power connection is in the power range connection range of substantially 0-5 centimeters.

115. The method of claim 114 wherein said power connection range is substantially 0-10 centimeters.

116. The method of claim 115 wherein said power connection range is substantially 0-20 centimeters.

117. The method of claim 114 wherein said primary transmitting coil and secondary receiving coils and wherein said at least one primary drive circuit and said secondary power conditioning circuit are adapted to: (a) continuously continue said transfer of said power between said primary transmitting coil and said secondary receiving coil until said power connection range limit is exceeded and said inductive connection thereby terminated, and, (b) automatically re-establish said inductive connection between said primary transmitting coil array and said secondary receiving coil upon detection of said primary transmitting coil and said secondary receiving coil within said power connection range of each other.

118. The method of claim 102 wherein a primary data processor in said data communication sub-system is adapted to: (a) continuously continue said transfer of said communication data between said communication data primary and secondary coils of said communication data primary and secondary inductive coil assemblies until said range limit of said near field communication is exceeded and said near field communication thereby terminated, and, (b) automatically re-establish said inductive connection between said primary and secondary communication data coils upon detection of said communication data primary and secondary coils within said range limit of said near field communication of each other.

119. The method of claim 96 wherein said support structure includes a seat having a seat back and wherein said seat back maybe rigid or flexible and wherein said primary inductive coil array is at least in part correspondingly rigid or flexible.

120. The method of claim 119 wherein said array includes coils having a ferrite backing and said ferrite backing is segmented so as to be flexible.

121. The method of claim 93 wherein at least one of said primary transmitting coil and said secondary receiving coil has a ferrite backing and said ferrite backing is segmented to provide flexibility.

122. The method of claim 119 wherein said secondary receiving coil is flexible so as to provide substantially parallel alignment of said primary transmitting coils in said array and said secondary receiving coil when said user is sitting in said seat with said back portion of said apparel against said seat back.

* * * * *